US010837371B2

(12) United States Patent
Kinoshita

(10) Patent No.: US 10,837,371 B2
(45) Date of Patent: Nov. 17, 2020

(54) VEHICLE POWER SUPPLY APPARATUS

(71) Applicant: SUBARU CORPORATION, Tokyo (JP)

(72) Inventor: Takahiro Kinoshita, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 0 days.

(21) Appl. No.: 16/371,767

(22) Filed: Apr. 1, 2019

(65) Prior Publication Data
US 2019/0316527 A1 Oct. 17, 2019

(30) Foreign Application Priority Data

Apr. 16, 2018 (JP) ................................ 2018-078451

(51) Int. Cl.
F02D 9/02 (2006.01)

(52) U.S. Cl.
CPC ...... *F02D 9/02* (2013.01); *B60Y 2300/18125* (2013.01); *F02D 2009/0235* (2013.01); *F02D 2009/0296* (2013.01)

(58) Field of Classification Search
CPC ........ B60K 6/485; B60K 6/547; B60K 6/543; B60L 58/13; B60L 7/10; B60L 15/2045; B60L 15/2054; B60W 10/06; B60W 10/08; B60W 10/107; B60W 20/00;
(Continued)

(56) References Cited

U.S. PATENT DOCUMENTS 5,875,864 A * 3/1999 Yano ...................... B60K 6/485
180/65.25
6,204,636 B1 * 3/2001 Kinoshita ............... B60L 58/12
320/134
(Continued)

FOREIGN PATENT DOCUMENTS

JP 09-284916 A 10/1997
JP 2000-97068 A 4/2000
(Continued)

OTHER PUBLICATIONS

Japanese Notice of Reasons for Refusal issued in corresponding Japanese Patent Application No. 2018-078451, dated Nov. 12, 2019, with English translation.

*Primary Examiner* — George C Jin
(74) *Attorney, Agent, or Firm* — McDermott Will & Emery LLP

(57) ABSTRACT

A vehicle power supply apparatus includes a generator, an electrical energy accumulator, a throttle valve, a power generation controller, a throttle plate position upper limit setting unit, and a throttle valve controller. The generator is coupled to an engine of a vehicle. The electrical energy accumulator is able to be coupled to the generator. The throttle valve is provided in an intake system of the engine. The power generation controller allows the generator to perform regenerative power generation on decelerated travel of the vehicle. The throttle plate position upper limit setting unit sets an upper limit of a throttle plate position of the throttle valve on the basis of a state of the electrical energy accumulator. The throttle valve controller controls the throttle plate position within a range downward from the upper limit, during the regenerative power generation by the generator.

14 Claims, 18 Drawing Sheets

(58) Field of Classification Search
CPC .. B60W 20/13; F02D 9/02; F02D 2009/0235; F02D 2009/0296; B60Y 2300/18125
See application file for complete search history.

(56) References Cited

U.S. PATENT DOCUMENTS

| | | | | |
|---|---|---|---|---|
| 6,225,784 | B1 * | 5/2001 | Kinoshita | B60K 6/485 320/132 |
| 6,847,189 | B2 * | 1/2005 | Frank | B60L 15/2045 320/104 |
| 2015/0274029 | A1 | 10/2015 | Tanaka et al. | |

FOREIGN PATENT DOCUMENTS

| | | |
|---|---|---|
| JP | 2001-263096 A | 9/2001 |
| JP | 2012-126264 A | 7/2012 |
| JP | 2016-027773 A | 2/2016 |

\* cited by examiner

VEHICLE POWER SUPPLY APPARATUS

CROSS-REFERENCE TO RELATED APPLICATIONS

This application claims priority from Japanese Patent Application No. 2018-078451 filed on Apr. 16, 2018, the entire contents of which are hereby incorporated by reference.

BACKGROUND

The technology relates to a vehicle power supply apparatus to be mounted on a vehicle.

Vehicles such as automobiles include generators, e.g., a motor generator, an alternator, and an integrated starter generator (ISG). Generators are controlled to a regenerative power generation state on decelerated travel from viewpoint of enhancement in fuel consumption performance of vehicles. For example, reference can be made to Japanese Unexamined Patent Application Publication (JP-A) Nos. H09-284916 and 2000-97068.

SUMMARY

An aspect of the technology provides a vehicle power supply apparatus to be mounted on a vehicle that includes an engine. The vehicle power supply apparatus includes a generator, an electrical energy accumulator, a throttle valve, a power generation controller, a throttle plate position upper limit setting unit, and a throttle valve controller. The generator is coupled to the engine. The electrical energy accumulator is able to be coupled to the generator. The throttle valve is provided in an intake system of the engine. The power generation controller is configured to allow the generator to perform regenerative power generation on decelerated travel of the vehicle. The throttle plate position upper limit setting unit is configured to set an upper limit of a throttle plate position of the throttle valve on the basis of a state of the electrical energy accumulator. The throttle valve controller is configured to control the throttle plate position within a range downward from the upper limit of the throttle plate position, during the regenerative power generation by the generator.

An aspect of the technology provides a vehicle power supply apparatus to be mounted on a vehicle that includes an engine. The vehicle power supply apparatus includes a generator, an electrical energy accumulator, a throttle valve, and circuitry. The generator is coupled to the engine. The electrical energy accumulator is able to be coupled to the generator. The throttle valve is provided in an intake system of the engine. The circuitry is configured to allow the generator to perform regenerative power generation on decelerated travel of the vehicle. The circuitry is configured to set an upper limit of a throttle plate position of the throttle valve on the basis of a state of the electrical energy accumulator. The circuitry is configured to control the throttle plate position within a range downward from the upper limit of the throttle plate position, during the regenerative power generation by the generator.

BRIEF DESCRIPTION OF THE DRAWINGS

The accompanying drawings are included to provide a further understanding of the technology and are incorporated in and constitute a part of this specification. The drawings illustrate example embodiments and, together with the specification, serve to explain the principles of the technology.

DETAILED DESCRIPTION

Figure 1:
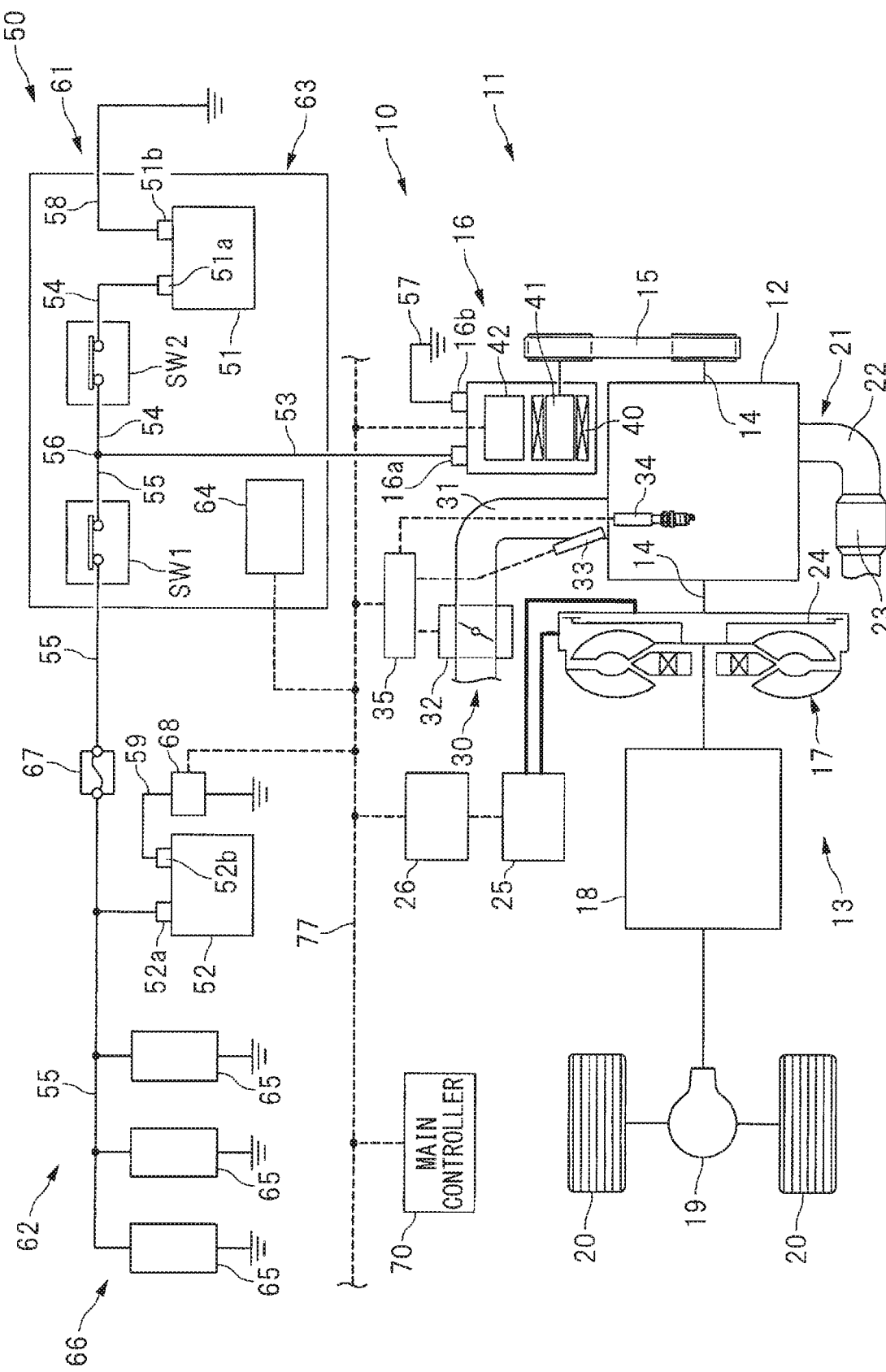
FIG. 1 is a schematic diagram of a configuration example of a vehicle on which a vehicle power supply apparatus according to one embodiment of the technology is mounted.

In the following, some preferred but non-limiting embodiments of the technology are described in detail with reference to the accompanying drawings. Note that sizes, materials, specific values, and any other factors illustrated in respective embodiments are illustrative for easier understanding of the technology, and are not intended to limit the scope of the technology unless otherwise specifically stated. Further, elements in the following example embodiments which are not recited in a most-generic independent claim of the technology are optional and may be provided on an as-needed basis. Throughout the present specification and the drawings, elements having substantially the same function and configuration are denoted with the same reference numerals to avoid any redundant description. Further, elements that are not directly related to the technology are unillustrated in the drawings. The drawings are schematic and are not intended to be drawn to scale.

In controlling a generator to a regenerative power generation state, a throttle valve is opened to reduce a pumping loss of an engine. This makes it possible to increase power generation torque of the generator, while suppressing an increase in a vehicle deceleration rate.

On the other hand, opening the throttle valve on decelerated travel causes an increase in an amount of intake air of an engine. Under this condition, a lowered engine speed may cause a restart of fuel injection, in which case arises possibility of an output of larger engine torque than expected. Thus, opening the throttle valve more than necessary may constitute a possible cause of an excessive increase in the engine torque. What is desired is, therefore, to properly control the throttle valve.

It is desirable to provide a vehicle power supply apparatus that makes it possible to properly control the throttle valve.
[Vehicle Configuration]

FIG. 1 schematically illustrates a configuration example of a vehicle 11 on which a vehicle power supply apparatus 10 according to one embodiment of the technology is mounted. Referring to FIG. 1, on the vehicle 11, a power unit 13 may be mounted. The power unit 13 may include an engine 12 that serves as a power source. The engine 12 may include a crank shaft 14 to which a starter generator 16 may be coupled through a belt mechanism 15. A transmission mechanism 18 may be also coupled to the engine 12 through a torque converter 17. One or more wheels 20 may be coupled to the transmission mechanism 18 through, for example but not limited to, a differential mechanism 19. It is to be noted that the engine 12 may include an exhaust system 21. The exhaust system 21 may include an exhaust manifold 22. The exhaust manifold 22 may include a catalyst converter 23 that purifies exhaust gas.

In one embodiment of the technology, the starter generator 16 may serve as a "generator".

The torque converter 17 may be coupled to the crank shaft 14 of the engine 12. In the torque converter 17, incorporated may be a lock up clutch 24. Controlling the lock up clutch 24 to an engaged state allows the engine 12 and the transmission mechanism 18 to be coupled through the lock up clutch 24. Controlling the lock up clutch 24 to a disengaged state allows the engine 12 and the transmission mechanism 18 to be coupled through the torque converter 17. In order to switch an operation state of the lock up clutch 24, a valve unit 25 may be coupled to the torque converter 17, and a transmission controller 26 may be coupled to the valve unit 25. The valve unit 25 may include, for example but not limited to, a solenoid valve and an oil path. The transmission controller 26 may include, for example but not limited to, a microcomputer.

The engine 12 may include an intake system 30. The intake system 30 may include an intake manifold 31. The intake manifold 31 may include a throttle valve 32 that adjusts an amount of intake air. Opening the throttle valve 32 to increase area of a flow path makes it possible to increase the amount of the intake air of the engine 12. Closing the throttle valve 32 to reduce the area of the flow path makes it possible to decrease the amount of the intake air of the engine 12. The engine 12 may further include an injector 33 that injects fuel into an intake port and a cylinder. Fuel injection from the injector 33 causes the engine 12 to be controlled to a fuel injection state. Stopping the fuel injection from the injector 33 causes the engine 12 to be controlled to a fuel cut state. The engine 12 may further include an ignition device 34. The ignition device 34 may include an ignitor and an ignition coil. Controlling ignition time by the ignition device 34 makes it possible to control, for example but not limited to, the engine torque and a combustion temperature of mixed air. It is to be noted that an engine controller 35 may be coupled to the throttle valve 32, the injector 33, and the ignition device 34. The engine controller 35 may include, for example but not limited to, a microcomputer.

The starter generator 16 coupled to the engine 12 may be a so-called integrated starter generator (ISG) that serves as a generator and an electric motor. Not only may the starter generator 16 serve as the generator driven by the crank shaft 14, the starter generator 16 may also serve as the electric motor that causes rotation of the crank shaft 14. For example, the starter generator 16 may serve as the electric motor, in a case of a restart of the engine 12 in an idling stop control, or in a case of assist driving of the engine 12 at the time of, for example, a start and acceleration. The starter generator 16 may include a stator 40 and a rotor 41. The stator 40 may include a stator coil. The rotor 41 may include a field coil. The starter generator 16 may further include an ISG controller 42, in order to control energized states of the stator coil and the field coil. The ISG controller 42 may include an inverter, a regulator, and a microcomputer, without limitation. Allowing the ISG controller 42 to control the energized states of the field coil and the stator coil makes it possible to control, for example but not limited to, a power generation voltage, power generation torque, and powering torque of the starter generator 16.
[Power Circuit]

Figure 2:
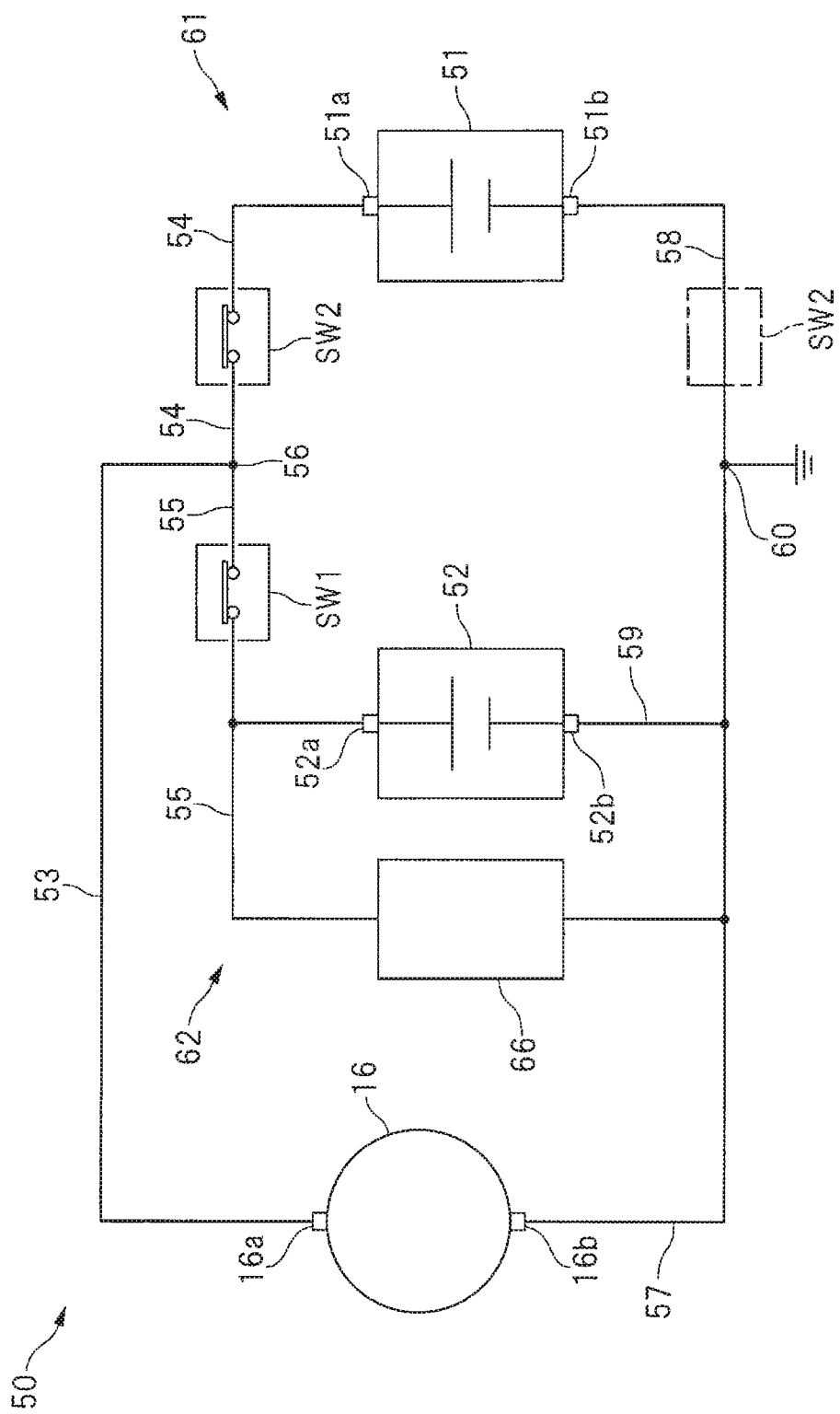
FIG. 2 is a circuit diagram of a simplified example of a power circuit.

The vehicle 11 may include a power circuit 50, description of which is given below. FIG. 2 is a circuit diagram of a simplified example of the power circuit 50. Referring to FIG. 2, the power circuit 50 may include a lithium ion battery 51 and a lead battery 52. The lithium ion battery 51 may be electrically coupled to the starter generator 16. The lead battery 52 may be electrically coupled, in parallel with the lithium ion battery 51, to the starter generator 16. It is to be noted that a terminal voltage of the lithium ion battery 51 may be higher in design than a terminal voltage of the lead battery 52, in order to positively cause discharge of the lithium ion battery 51. Moreover, internal resistance of the lithium ion battery 51 may be smaller in design than internal resistance of the lead battery 52, in order to positively cause charge and the discharge of the lithium ion battery 51.

In one embodiment of the technology, the lithium ion battery 51 may serve as an "electrical energy accumulator".

A positive electrode line 53 may be coupled to a positive electrode terminal 16a of the starter generator 16. A positive electrode line 54 may be coupled to a positive electrode terminal 51a of the lithium ion battery 51. A positive electrode line 55 may be coupled to a positive electrode terminal 52a of the lead battery 52. The positive electrode lines 53, 54, and 55 may be coupled to one another through a connection point 56. Moreover, a negative electrode line 57 may be coupled to a negative electrode terminal 16b of the starter generator 16. A negative electrode line 58 may be coupled to a negative electrode terminal 51b of the lithium ion battery 51. A negative electrode line 59 may be coupled to a negative electrode terminal 52b of the lead battery 52. The negative electrode lines 57, 58, and 59 may be coupled to one another through a reference potential point 60.

A switch SW1 may be provided on the positive electrode line 55 of the lead battery 52. The switch SW1 may be switchable between an ON state and an OFF state. Controlling the switch SW1 to the OFF state makes it possible to isolate a power supply system 61 and a power supply system 62 from each other. The power supply system 61 may include the lithium ion battery 51 and the starter generator 16. The power supply system 62 may include the lead battery 52 and a group of electric devices 66 described later. Moreover, a switch SW2 may be provided on the positive electrode line 54 of the lithium ion battery 51. The switch SW2 may be switchable between an ON state and an OFF state. Controlling the switch SW2 to the OFF state makes it possible to isolate the lithium ion battery 51 from the rest of the power circuit 50, in particular, from the starter generator 16.

The switches SW1 and SW2 may each be a switch constituted by a semiconductor element such as a metal oxide semiconductor field effect transistor (MOSFET), or alternatively the switches SW1 and SW2 may each be a switch that causes a contact to mechanically open or close with the use of, for example but not limited to, electromagnetic force. The ON state of the switches SW1 and SW2 refers to an energized state or an electrically conductive state that forms electrical coupling. The OFF state of the switches SW1 and SW2 refers to an unenergized state or a cut-off state that forms electrical isolation. It is to be noted that the switches SW1 and SW2 may be also referred to as, for example, a relay or a contactor.

As illustrated in FIG. 1, the power circuit 50 may include a battery module 63. Not only the lithium ion battery 51 but also the switches SW1 and SW2 may be incorporated in the battery module 63. The battery module 63 may further include a battery controller 64. The battery controller 64 may include, for example but not limited to, a microcomputer. The battery controller 64 may have a function of monitoring, for example but not limited to, a state of charge (SOC), a charge current, a discharge current, the terminal voltage, a cell temperature, and the internal resistance of the lithium ion battery 51. The battery controller 64 may also have a function of controlling the switches SW1 and SW2. It is to be noted that the state of charge SOC refers to a ratio of an amount of charged power to a designed capacity of a battery.

It is to be noted that as illustrated in FIG. 1, the group of the electric devices 66 may be coupled to the positive electrode line 55 of the lead battery 52. The group of the electric devices 66 may include electric devices 65 such as headlights. Moreover, a fuse 67 may be provided on the positive electrode line 55 of the lead battery 52. The fuse 67 may protect the group of the electric devices 66, without limitation. Furthermore, a battery sensor 68 may be provided on the negative electrode line 59 of the lead battery 52. The battery sensor 68 may have a function of detecting, for example but not limited to, a charge current, a discharge current, the terminal voltage, and a state of charge of the lead battery 52.

[Control System]

Figure 3:
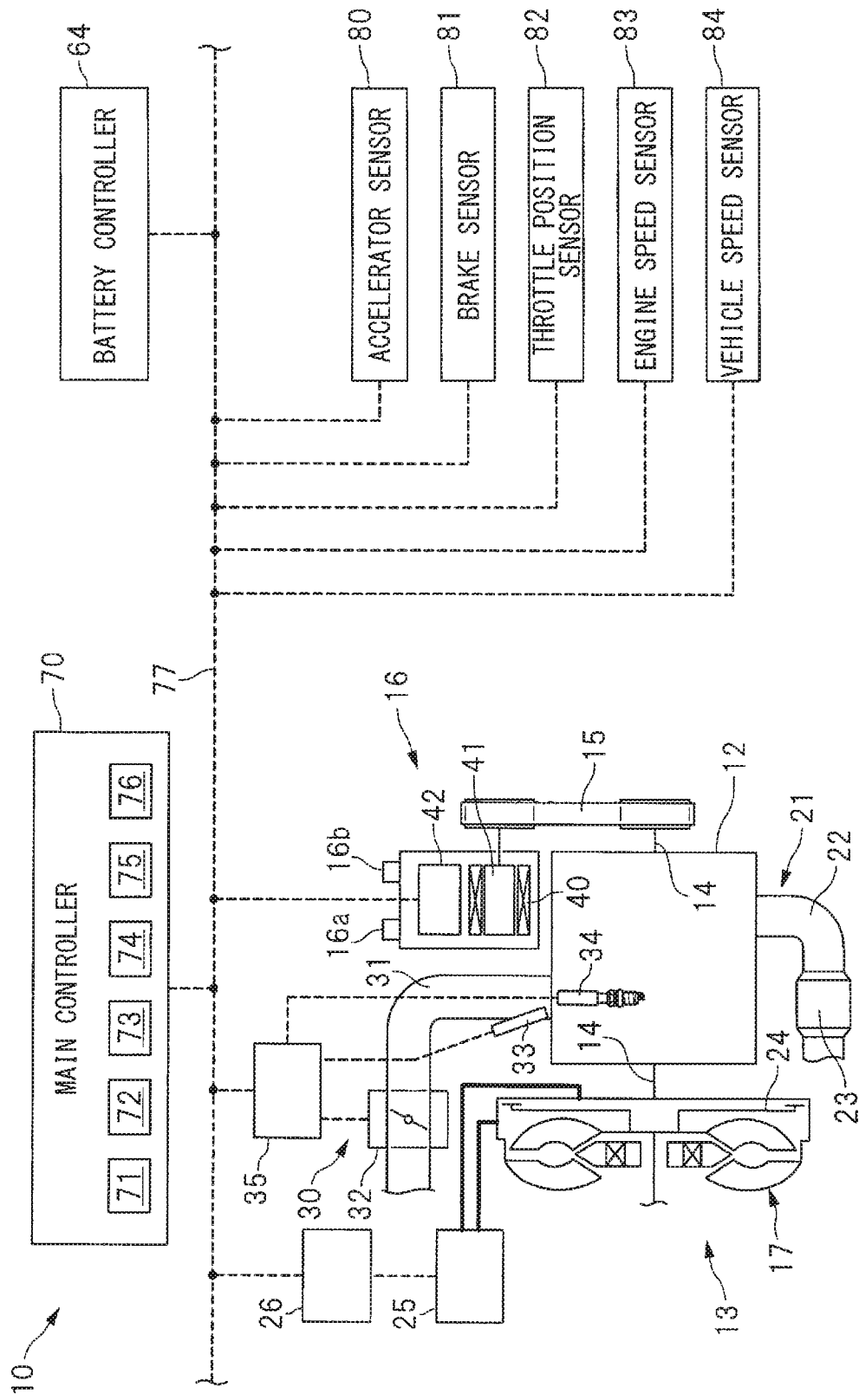
FIG. 3 is a schematic diagram of an example of a control system of the vehicle power supply apparatus.

FIG. 3 schematically illustrates an example of a control system of the vehicle power supply apparatus 10. As illustrated in FIGS. 1 and 3, the vehicle power supply apparatus 10 may include a main controller 70. The main controller 70 is provided for a cooperative control of, for example but not limited to, the engine 12 and the starter generator 16. The main controller 70 may include, for example but not limited to, a microcomputer. The main controller 70 may include, for example but not limited to, a fuel control unit 71, an ignition control unit 72, a throttle valve control unit 73, a power generation control unit 74, and a lock up clutch control unit 75. The fuel control unit 71 may control the injector 33. The ignition control unit 72 may control the ignition device 34. The throttle valve control unit 73 may control the throttle valve 32. The power generation control unit 74 may control the starter generator 16. The lock up clutch control unit 75 may control the lock up clutch 24.

The main controller 70, the transmission controller 26, the engine controller 35, the ISG controller 42, and the battery controller 64 may be communicatively coupled to one another through an on-vehicle network 77 such as a controller area network (CAN) and a local interconnect network (LIN). On the basis of information from the controllers as recited above and sensors, the main controller 70 may control the starter generator 16, the lock up clutch 24, the throttle valve 32, the injector 33, and the ignition device 34, without limitation. It is to be noted that the main controller 70 may control an operation state of the starter generator 16, through the ISG controller 42. The main controller 70 may control an operation state of the lock up clutch 24, through the transmission controller 26. The main controller 70 may control operation states of the throttle valve 32, the injector 33, and the ignition device 34, through the engine controller 35.

As illustrated in FIG. 3, the sensors may be coupled to the main controller 70. Non-limiting examples of the sensors may include an accelerator sensor 80, a brake sensor 81, a throttle position sensor 82, an engine speed sensor 83, and a vehicle speed sensor 84. The accelerator sensor 80 may detect an amount of operation of an accelerator pedal. The brake sensor 81 may detect an amount of operation of a brake pedal. The throttle position sensor 82 may detect a throttle plate position of the throttle valve 32. The engine speed sensor 83 may detect an engine speed, i.e., a rotation speed of the engine 12. The vehicle speed sensor 84 may detect a vehicle speed, i.e., a travel speed of the vehicle 11. Moreover, the main controller 70 may be supplied, by the controllers as recited above, with information regarding operation of, for example but not limited to, the injector 33, the ignition device 34, the throttle valve 32, the starter generator 16, the lock up clutch 24, and the battery module 63.

[Starter Generator Control]

The power generation control unit 74 of the main controller 70 may set a target power generation voltage of the starter generator 16, on the basis of the state of charge SOC of the lithium ion battery 51. The power generation control unit 74 may supply the target power generation voltage to the ISG controller 42. The ISG controller 42 may control the power generation voltage of the starter generator 16 in accordance with the target power generation voltage, to control the starter generator 16 to a combustion power generation state or a power generation suspended state, as described below.

Figure 4:
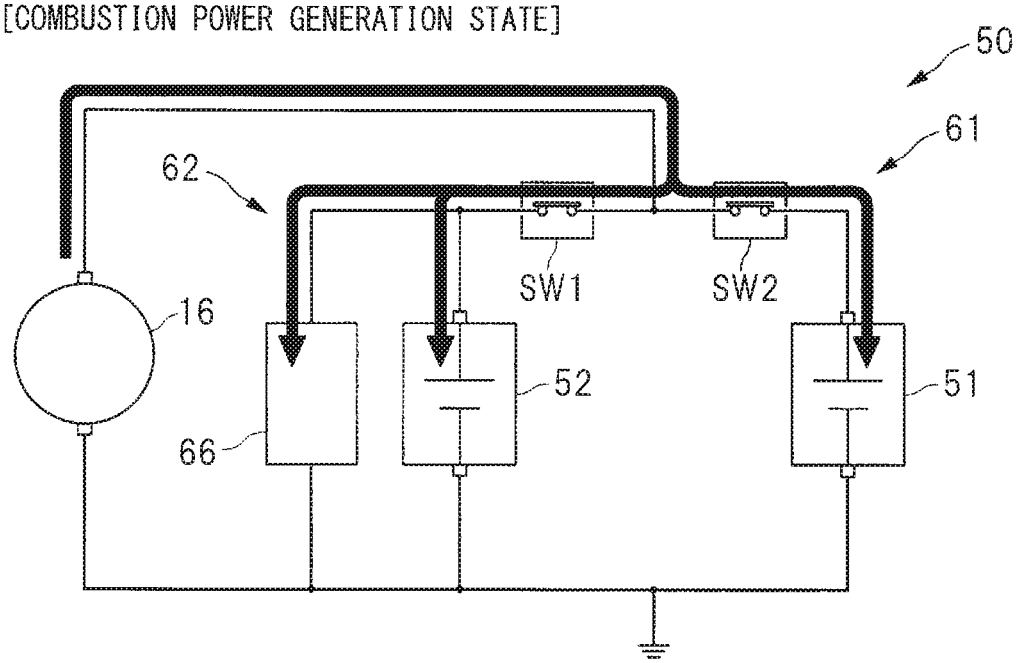
FIG. 4 is a diagram of an example of a situation as to how currents are supplied, with a starter generator controlled to a combustion power generation state.

FIG. 4 illustrates an example of a situation as to how currents are supplied, with the starter generator 16 controlled to the combustion power generation state. In one specific but non-limiting example, in a case where the state of charge SOC of the lithium ion battery 51 is lower than a predetermined lower limit, the starter generator 16 may be driven, by engine power, for power generation, in order to charge the lithium ion battery 51 and to increase the state of charge SOC. Thus, in controlling the starter generator 16 to the combustion power generation state, the power generation voltage may be raised, to make an adjustment so that the power generation voltage to be applied to the lithium ion battery 51 becomes higher than the terminal voltage. In this way, as denoted by black arrows in FIG. 4, currents may be supplied from the starter generator 16 to, for example but not limited to, the lithium ion battery 51, the group of the electric devices 66, and the lead battery 52, causing the lithium ion battery 51 and the lead battery 52 to be charged slowly.

Figure 5:
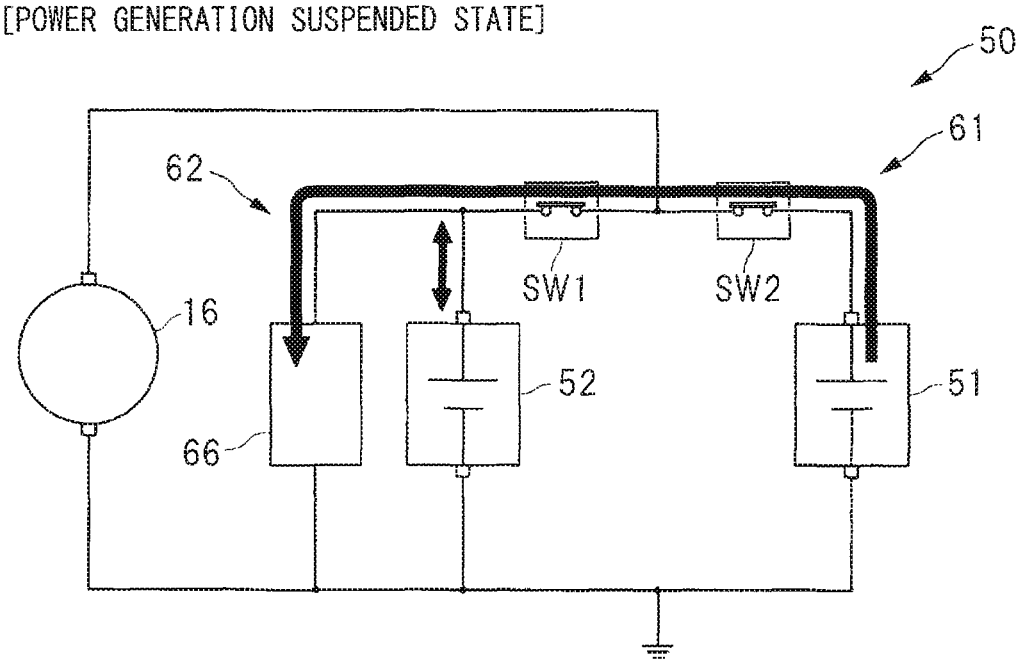
FIG. 5 is a diagram of an example of a situation as to how currents are supplied, with the starter generator controlled to a power generation suspended state.

FIG. 5 illustrates an example of a situation as to how currents are supplied, with the starter generator 16 controlled to the power generation suspended state. In one specific but non-limiting example, in a case where the state of charge SOC of the lithium ion battery 51 is higher than a predetermined upper limit, driving the starter generator 16, with the use of the engine power, for the power generation may be stopped, in order to positively cause the discharge of the lithium ion battery 51. Thus, in controlling the starter generator 16 to the power generation suspended state, the power generation voltage of the starter generator 16 may be lowered, to make an adjustment so that the power generation voltage to be applied to the lithium ion battery 51 becomes lower than the terminal voltage. In this way, as denoted by black arrows in FIG. 5, a current may be supplied from the lithium ion battery 51 to the group of the electric devices 66. This makes it possible to suppress or stop the driving of the starter generator 16 for the power generation, leading to reduction in an engine load.

As mentioned above, the power generation control unit 74 of the main controller 70 may control the starter generator 16 to the combustion power generation state or the power generation suspended state on the basis of the state of charge SOC. Meanwhile, during vehicle deceleration, it is necessary to recover much kinetic energy to enhance fuel consumption performance. Therefore, during the vehicle deceleration, the power generation voltage of the starter generator 16 may be raised considerably, to control the starter generator 16 to a regenerative power generation state. This makes it possible to increase regenerative power, i.e., power-generated electric power, of the starter generator 16, and to positively convert the kinetic energy to electric energy and to recover the electric energy, leading to higher energy efficiency of the vehicle 11 and the enhancement in the fuel consumption performance.

A determination as to whether or not to control the starter generator 16 to the regenerative power generation state may be made on the basis of, for example but not limited to, operation states of the accelerator pedal and the brake pedal. For example, on the decelerated travel with a release of stepping down of the accelerator pedal, or on the decelerated travel with stepping down of the brake pedal, the situation is that the engine 12 is about to be controlled to the fuel cut state. Accordingly, the starter generator 16 may be controlled to the regenerative power generation state. It is to be noted that on accelerated travel with the stepping down of the accelerator pedal, or on steady travel, the situation is that the engine 12 is about to be controlled to the fuel injection state. Accordingly, the starter generator 16 may be controlled to the combustion power generation state or the power generation suspended state.

Figure 6:
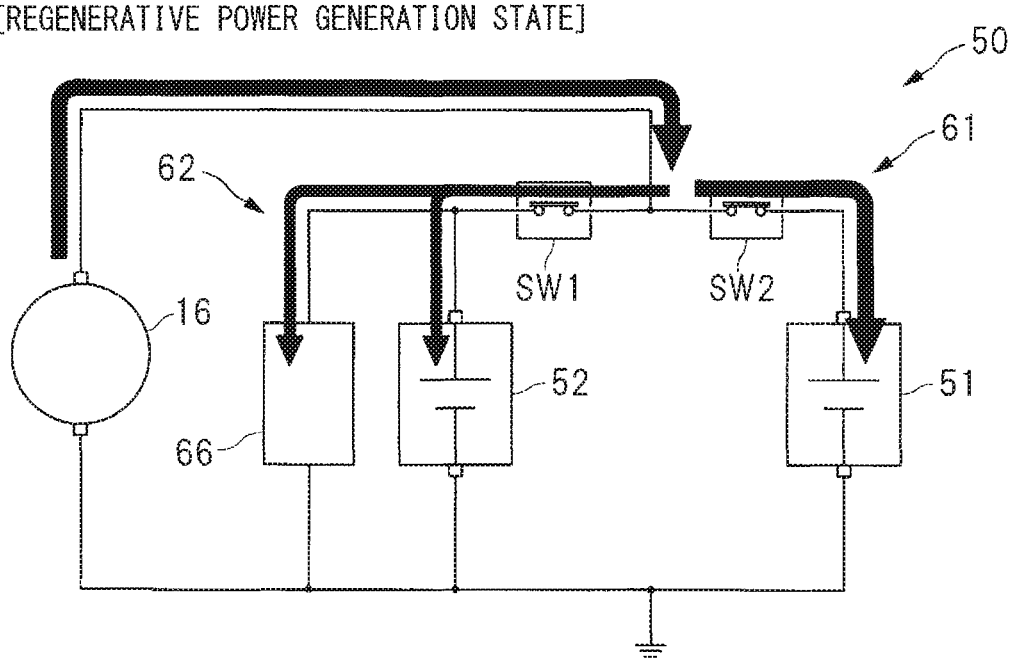
FIG. 6 is a diagram of an example of a situation as to how currents are supplied, with the starter generator controlled to a regenerative power generation state.

FIG. 6 illustrates an example of a situation as to how currents are supplied, with the starter generator 16 controlled to the regenerative power generation state. In controlling the starter generator 16 to the regenerative power generation state, the power generation voltage of the starter generator 16 may be raised to a higher value than in the combustion power generation state as mentioned above. Thus, the power generation voltage to be applied to the lithium ion battery 51 may be brought to a higher value than the terminal voltage. This causes large current supply from the starter generator 16 to the lithium ion battery 51 and the lead battery 52, as denoted by black arrows in FIG. 6, resulting in rapid charge of the lithium ion battery 51 and the lead battery 52. Moreover, because the internal resistance of the lithium ion battery 51 is smaller than the internal resistance of the lead battery 52, most of the power-generated current is supplied to the lithium ion battery 51.

It is to be noted that as illustrated in FIGS. 4 to 6, in controlling the starter generator 16 to the combustion power generation state, the regenerative power generation state, and the power generation suspended state, the switches SW1 and SW2 may be kept in the ON state. In other words, in the vehicle power supply apparatus 10, it is possible to control the charge and the discharge of the lithium ion battery 51 solely by controlling the power generation voltage of the starter generator 16 without making a switching control of the switches SW1 and SW2. Hence, it is possible to easily control the charge and the discharge of the lithium ion battery 51, and to enhance durability of the switches SW1 and SW2.

Figure 7:
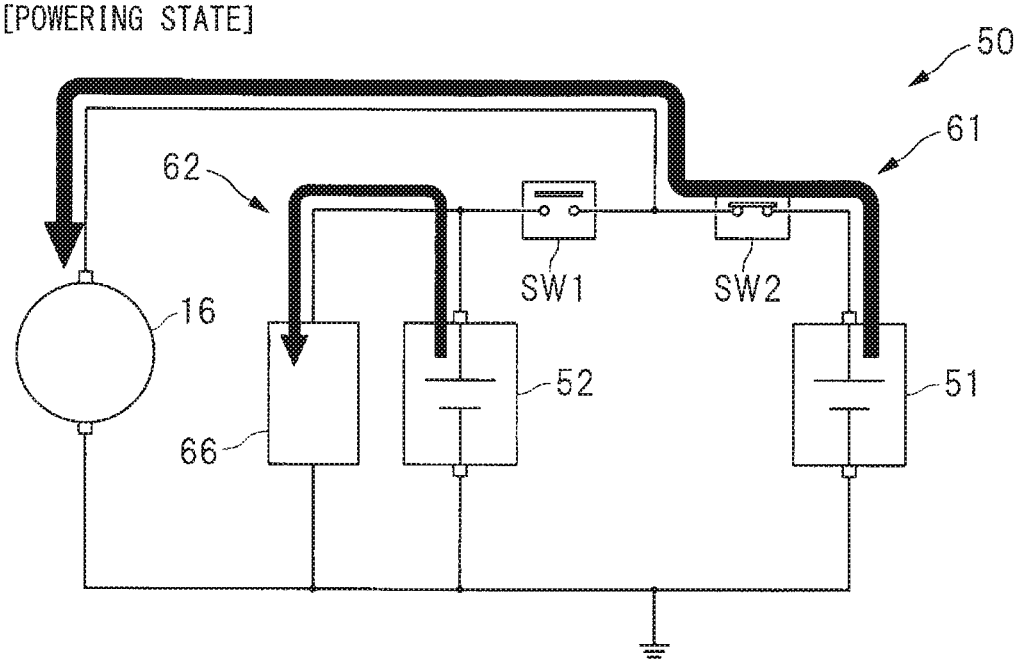
FIG. 7 is a diagram of an example of a situation as to how currents are supplied, with the starter generator controlled to a powering state.

FIG. 7 illustrates an example of a situation as to how currents are supplied, with the starter generator 16 controlled to a powering state. Referring to FIG. 7, in controlling the starter generator 16 to the powering state, the switch SW1 may be switched from the ON state to the OFF state. In other words, the switch SW1 may be switched from the ON state to the OFF state in a case where the starter generator 16 brings the engine 12 to starting rotation, and in a case where the starter generator 16 is engaged in assist driving of the engine 12. This causes isolation of the power supply systems 61 and 62 from each other, making it possible to prevent an instantaneous voltage drop with respect to, for example, the group of the electric devices 66, even in a case with large current supply from the lithium ion battery 51 to the starter generator 16. Hence, it is possible to allow, for example, the group of the electric devices 66 to function normally.

[Regenerative Power Generation Control]

Figure 8:
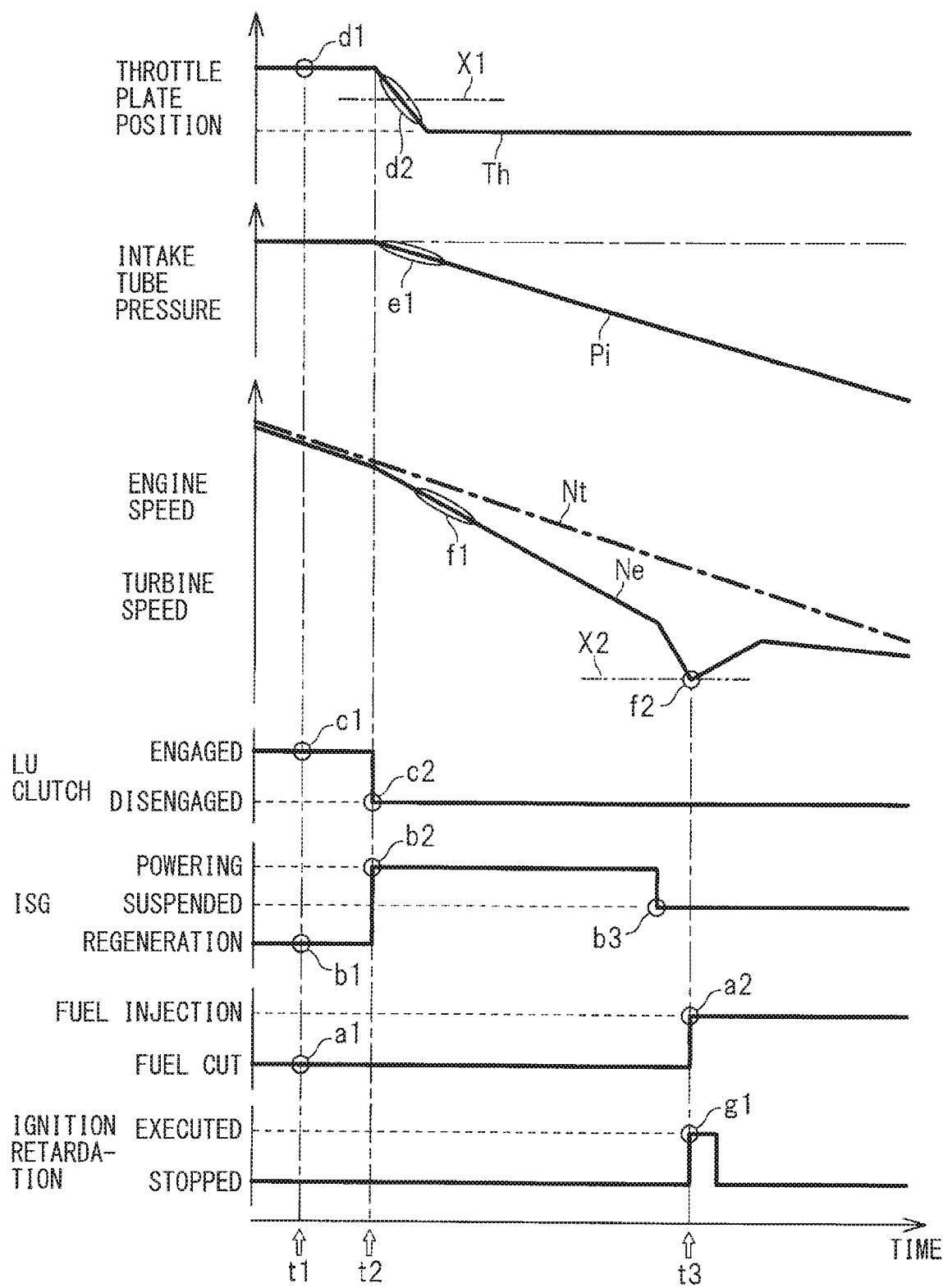
FIG. 8 is a timing chart of an example of operation states of the starter generator, a throttle valve, a lock up clutch, and other parts, in a regenerative power generation control.
Figure 9A:
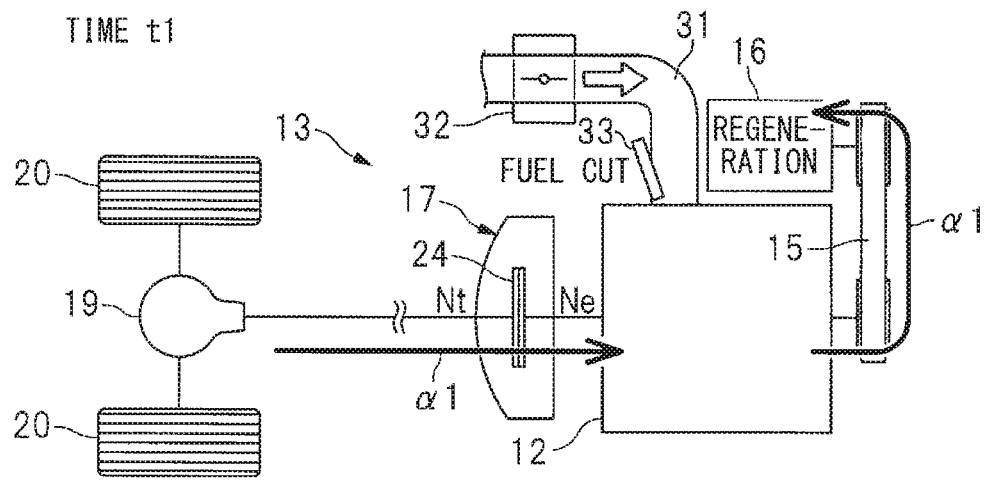
FIGS. 9A to 9C are schematic diagrams of examples of operation states of a power unit in the regenerative power generation control.
Figure 9B:
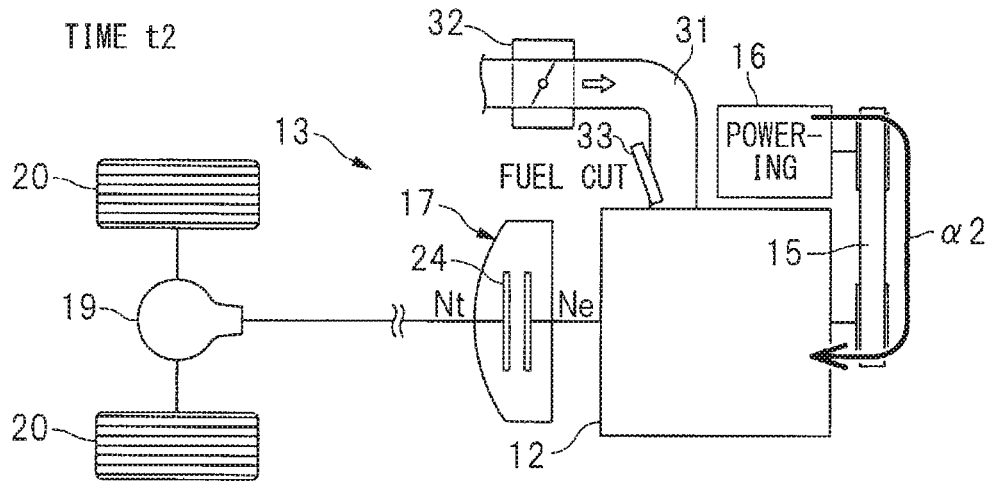
Figure 9C:
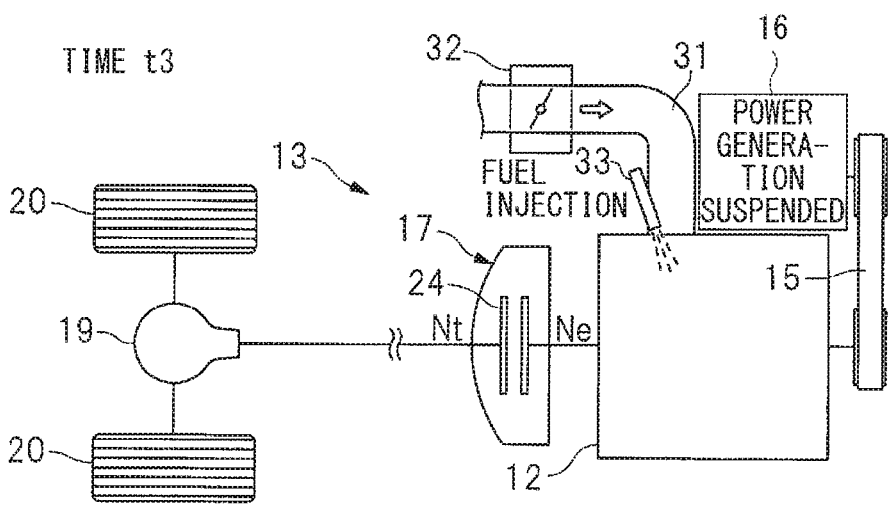

Described is an example of a regenerative power generation control to be executed by the vehicle power supply apparatus 10. FIG. 8 is a timing chart of an example of operation states of the starter generator 16, the throttle valve 32, the lock up clutch 24, and other parts, in the regenerative power generation control. A travel situation illustrated in FIG. 8 is coasting in which the stepping down of the accelerator pedal and the brake pedal is released. FIGS. 9A, 9B, and 9C schematically illustrate examples of operation states of the power unit 13 in the regenerative power generation control. FIG. 9A illustrates a situation at time t1 illustrated in FIG. 8. FIG. 9B illustrates a situation at time t2 illustrated in FIG. 8. FIG. 9C illustrates a situation at time t3 illustrated in FIG. 8.

In FIG. 8, the lock up clutch 24 is abbreviated to "LU clutch". The starter generator 16 is abbreviated to "ISG". The throttle plate position of the throttle valve 32 is abbreviated to "Th". An intake tube pressure inside the intake manifold 31 is abbreviated to "Pi". It is to be noted that the throttle plate position of the throttle valve 32 is hereinafter referred to as the throttle plate position. In FIGS. 8 and 9A to 9C, the engine speed is abbreviated to "Ne". The engine speed means a rotation speed on input side, i.e., on engine side, of the lock up clutch 24. A turbine speed is abbreviated to "Nt". The turbine speed means a rotation speed on output side, i.e., on wheel side, of the lock up clutch 24. In this specification, the term "openwise" of the throttle valve 32 means a direction in which the throttle plate position becomes larger than a predetermined reference value X1, while the term "closewise" of the throttle valve 32 means a direction in which the throttle plate position becomes smaller than the reference value X1.

(Time t1)

As illustrated in FIG. 8, at time t1, in the coasting in which the stepping down of the accelerator pedal is released, the engine 12 may be controlled to the fuel cut state (reference characters a1). The starter generator 16 may be controlled to the regenerative power generation state (reference characters b1). The lock up clutch 24 may be controlled to the engaged state (reference characters c1). In other words, as illustrated in FIG. 9A, because the lock up clutch 24 is engaged in the coasting, it is possible to efficiently transmit rotational power from the one or more wheels 20 to the starter generator 16, as denoted by an arrow α1. Hence, it is possible to increase regenerative torque of the starter generator 16, i.e., the power generation torque of the starter generator 16, leading to an increase in the power-generated electric power in the coasting.

Moreover, as illustrated in FIG. 8, at time t1, in the coasting in which regenerative power generation is performed, the throttle valve 32 may be controlled openwise (reference characters d1). Controlling the throttle valve 32 openwise makes it possible to increase the amount of the intake air of the engine 12, as denoted by a white outlined arrow in FIG. 9A, and to reduce the pumping loss of the engine 12. This leads to reduction in engine braking during the vehicle deceleration. It is therefore possible to increase the power generation torque without excessively increasing the vehicle deceleration rate, to increase the power-generated electric power, and to recover much kinetic energy. It is to be noted that in controlling the throttle valve 32 openwise, the throttle plate position may be adjusted so as to prevent shortage of negative pressure of, for example, an undepicted vacuum booster.

(Time t2)

As illustrated in FIG. 8, at time t2, the lock up clutch 24 may be switched from the engaged state to a disengaged state (reference characters c2), and thereupon, the throttle valve 32 may be controlled from openwise to closewise (reference characters d2). Moreover, at time t2, the lock up clutch 24 may be switched from the engaged state to the disengaged state (reference characters c2), and thereupon, the starter generator 16 may be controlled from the regenerative power generation state to the powering state (reference characters b2). The starter generator 16 may be controlled in the powering state for predetermined time, and thereafter, the starter generator 16 may be switched from the powering state to the power generation suspended state (reference characters b3). It is to be noted that examples of conditions of disengagement of the lock up clutch 24 on the decelerated travel may include that the vehicle speed is lower than a predetermined value, that the vehicle deceleration rate is higher than a predetermined value, and that the engine speed is lower than a predetermined value. However, these examples of the conditions are non-limiting.

As mentioned above, the disengagement of the lock up clutch 24 on the decelerated travel may cause the throttle valve 32 to be controlled closewise (reference characters d2). This makes it possible, as described later, to lower the intake tube pressure Pi inside the intake manifold 31 (reference characters e1), and to reduce the amount of the intake air of the engine 12, for preparation of a restart of fuel injection. Moreover, as mentioned above, the disengagement of the lock up clutch 24 on the decelerated travel may cause the starter generator 16 to be controlled to the powering state (reference characters b2). Thus, allowing the starter generator 16 to power makes it possible to transmit motor torque from the starter generator 16 to the engine 12, as denoted by an arrow α2 in FIG. 9B. This makes it possible to slowly lower the engine speed Ne, as denoted by reference characters f1 in FIG. 8. Hence, as described later, it is possible to provide adequate time before the restart of the fuel injection, and to sufficiently reduce the amount of the intake air of the engine 12.

(Time t3)

As illustrated in FIG. 8, at time t3, the engine speed Ne may reach a predetermined lower limit X2 (reference characters f2), and thereupon, the fuel injection into the engine 12 may be restarted (reference characters a2) from viewpoint of prevention of engine stall. In other words, in a case where the engine speed Ne lowers to the lower limit X2, the engine 12 may be switched from the fuel cut state to the fuel injection state. The restart of the fuel injection into the engine 12 may cause the engine torque to be outputted so as to accelerate the vehicle 11. Thus, possibility may arise that the vehicle deceleration rate decreases considerably on the decelerated travel, giving an occupant the sense of incongruity.

As mentioned above, however, upon the disengagement of the lock up clutch 24, the vehicle power supply apparatus 10 may control the throttle valve 32 closewise (reference characters d2). This makes it possible to reduce the amount of the intake air of the engine 12, leading to reduction in the engine torque to be outputted in accompaniment with the restart of the fuel injection. Moreover, upon the disengagement of the lock up clutch 24, the vehicle power supply apparatus 10 may control the starter generator 16 to the powering state (reference characters b2). This makes it possible to lower the engine speed Ne slowly (reference characters f1), and to provide adequate time before the engine speed Ne reaches the lower limit X2 and the fuel injection is restarted. Hence, it is possible to sufficiently reduce the amount of the intake air of the engine 12, and to reduce the engine torque to be outputted in accompaniment with the restart of the fuel injection.

Furthermore, at the restart of the fuel injection into the engine 12, the vehicle power supply apparatus 10 may execute an ignition retard control, as denoted by reference characters g1. The ignition retard control includes retarding the ignition time of the engine 12. Hence, it is possible to reduce the engine torque more, and to restart the fuel injection without giving the occupant the sense of incongruity. It is to be noted that in the ignition retard control, as the amount of the intake air becomes larger, an amount of retardation of the ignition time may be set at a larger value. As the amount of the intake air becomes smaller, the amount of the retardation of the ignition time may be set at a smaller value. It is to be noted that it should be appreciated that the ignition retard control may be stopped in a case where the amount of the intake air is small and the engine torque is reduced sufficiently.

[Throttle Plate Position Upper Limit of Throttle Valve]

As mentioned above, during the regenerative power generation, the throttle valve 32 may be controlled openwise, in order to increase an amount of the regenerative power generation by the starter generator 16. On the other hand, controlling the throttle valve 32 openwise may constitute a possible cause of an increase in the amount of the intake air, and a possible cause of an increase in the engine torque at the restart of the fuel injection. Thus, as illustrated in FIG. 3, the main controller 70 includes a throttle plate position upper limit setting unit 76 that sets a throttle plate position upper limit Thmax of the throttle valve 32, in order to prevent an excessive increase in the amount of the intake air during the regenerative power generation.

As described later, the throttle plate position upper limit setting unit 76 of the main controller 70 sets the throttle plate position upper limit Thmax of the throttle valve 32, on the basis of a state of the lithium ion battery 51. Thus, during the regenerative power generation by the starter generator 16, the throttle valve control unit 73 of the main controller 70 controls the throttle plate position of the throttle valve 32 within a range downward from the throttle plate position upper limit Thmax. In other words, during the regenerative power generation by the starter generator 16, the throttle valve 32 may be controlled openwise as mentioned above, but in a case where the throttle plate position upper limit Thmax is set at a small value, the throttle valve 32 may be controlled closewise.

Figure 10:
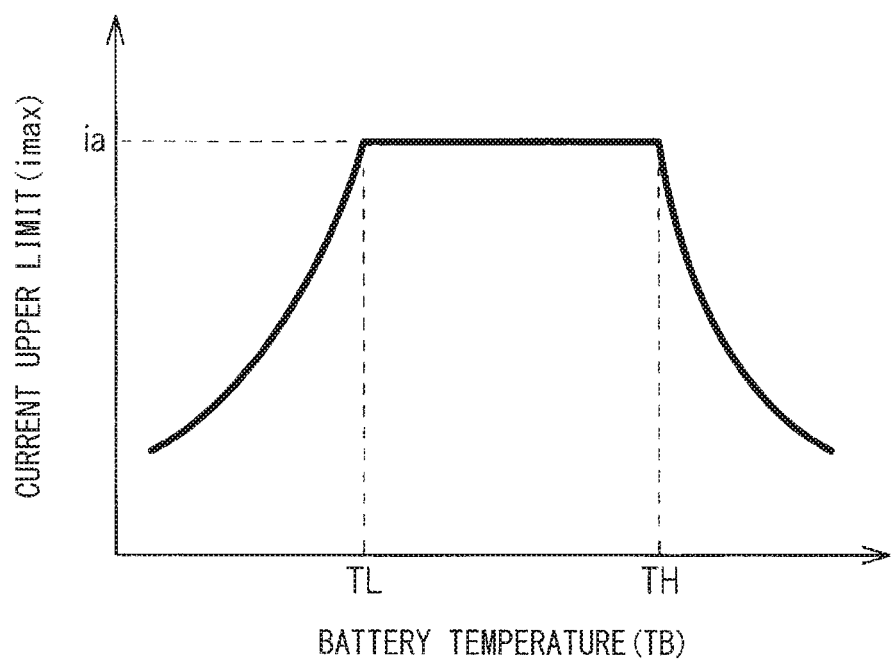
FIG. 10 is a diagram of an example of relation between a battery temperature and a current upper limit.
Figure 11:
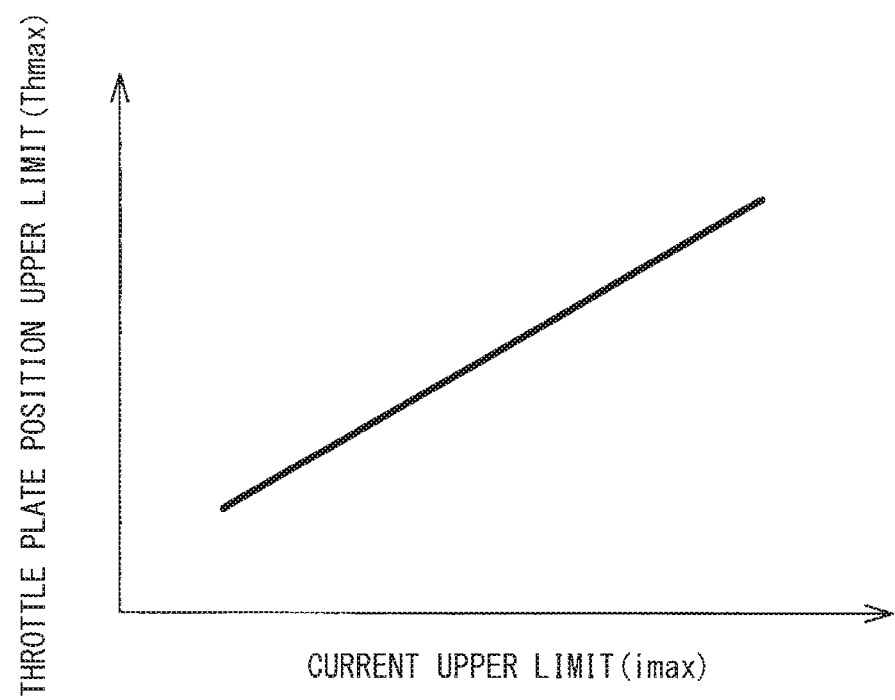
FIG. 11 is a diagram of an example of relation between the current upper limit and an upper limit of a throttle plate position.

In what follows, described is an example of a setting procedure of the throttle plate position upper limit Thmax. FIG. 10 is a diagram of an example of relation between a battery temperature TB and a current upper limit imax. FIG. 11 is a diagram of an example of relation between the current upper limit imax and the throttle plate position upper limit Thmax.

The throttle plate position upper limit setting unit 76 of the main controller 70 may set the current upper limit imax of the lithium ion battery 51 on the basis of a temperature of the lithium ion battery 51. Hereinafter the temperature of the lithium ion battery 51 is referred to as the battery temperature TB. The current upper limit imax is an upper limit of the charge current that is tolerable for the lithium ion battery 51. As illustrated in FIG. 10, in a high temperature region where the battery temperature TB is higher than a first temperature threshold TH, the current upper limit imax may be lowered as the battery temperature TB becomes higher. Thus, in a case where the battery temperature TB makes transitions within the high temperature region, the current upper limit imax may be lowered, to reduce the charge current of the lithium ion battery 51, in order to lower the battery temperature TB and to protect the lithium ion battery 51.

Moreover, as illustrated in FIG. 10, in a low temperature region where the battery temperature TB is lower than a second temperature threshold TL that is lower than the first temperature threshold TH, the current upper limit imax may be lowered as the battery temperature TB becomes lower. In a case where the battery temperature TB makes transitions within the low temperature region as mentioned above, it is difficult to charge the lithium ion battery 51 because the internal resistance of the lithium ion battery 51 becomes higher. Accordingly, in the case where the battery temperature TB makes transitions within the low temperature region, lowering the current upper limit imax makes it possible to reduce the charge current of the lithium ion battery 51.

It is to be noted that in a case where the battery temperature TB remains within a range from the second temperature threshold TL to the first temperature threshold TH, a current value is beyond the reach of the charge current may be set as the current upper limit imax. In other words, in a case where the battery temperature TB remains within the range from the second temperature threshold TL to the first temperature threshold TH, the current upper limit imax may be set at a considerably high value, in order not to limit the charge current of the lithium ion battery 51.

Thereafter, the throttle plate position upper limit setting unit 76 of the main controller 70 may set the throttle plate position upper limit Thmax of the throttle valve 32 on the basis of the current upper limit imax of the lithium ion battery 51. The throttle plate position upper value Thmax is an upper limit of the throttle plate position Th that is tolerable during the regenerative power generation by the starter generator 16. As illustrated in FIG. 11, as the current upper limit imax of the lithium ion battery 51 lowers, the throttle plate position upper limit Thmax of the throttle valve 32 may be lowered. Thus, setting the throttle plate position upper limit Thmax on the basis of the current upper limit imax makes it possible to control the throttle valve 32 properly in accordance with a situation of the regenerative power generation.

In other words, a situation that the current upper limit imax of the lithium ion battery 51 is lowered is a situation that the power-generated current of the starter generator 16 is limited, and is a situation that the power generation torque of the starter generator 16 is limited. That is to say, in such situations, the vehicle deceleration rate is hardly subject to an excessive increase because of the power generation torque during the regenerative power generation, and the decrease in the throttle plate position Th is tolerable. Thus, the throttle plate position upper limit Thmax may be lowered, under the situation that the decrease in the throttle plate position Th is tolerable, i.e., under the situation that the current upper limit imax lowers. Hence, it is possible to close the throttle valve 32 to reduce the amount of the intake air, and to reduce the engine torque at the restart of the fuel injection.

As described above, setting the throttle plate position upper limit Thmax of the throttle valve 32 on the basis of the battery temperature TB as an indicator of the state of the lithium ion battery 51 makes it possible to control the throttle valve 32 properly during the regenerative power generation.

[High Temperature Region of Lithium Ion Battery]

Figure 12:
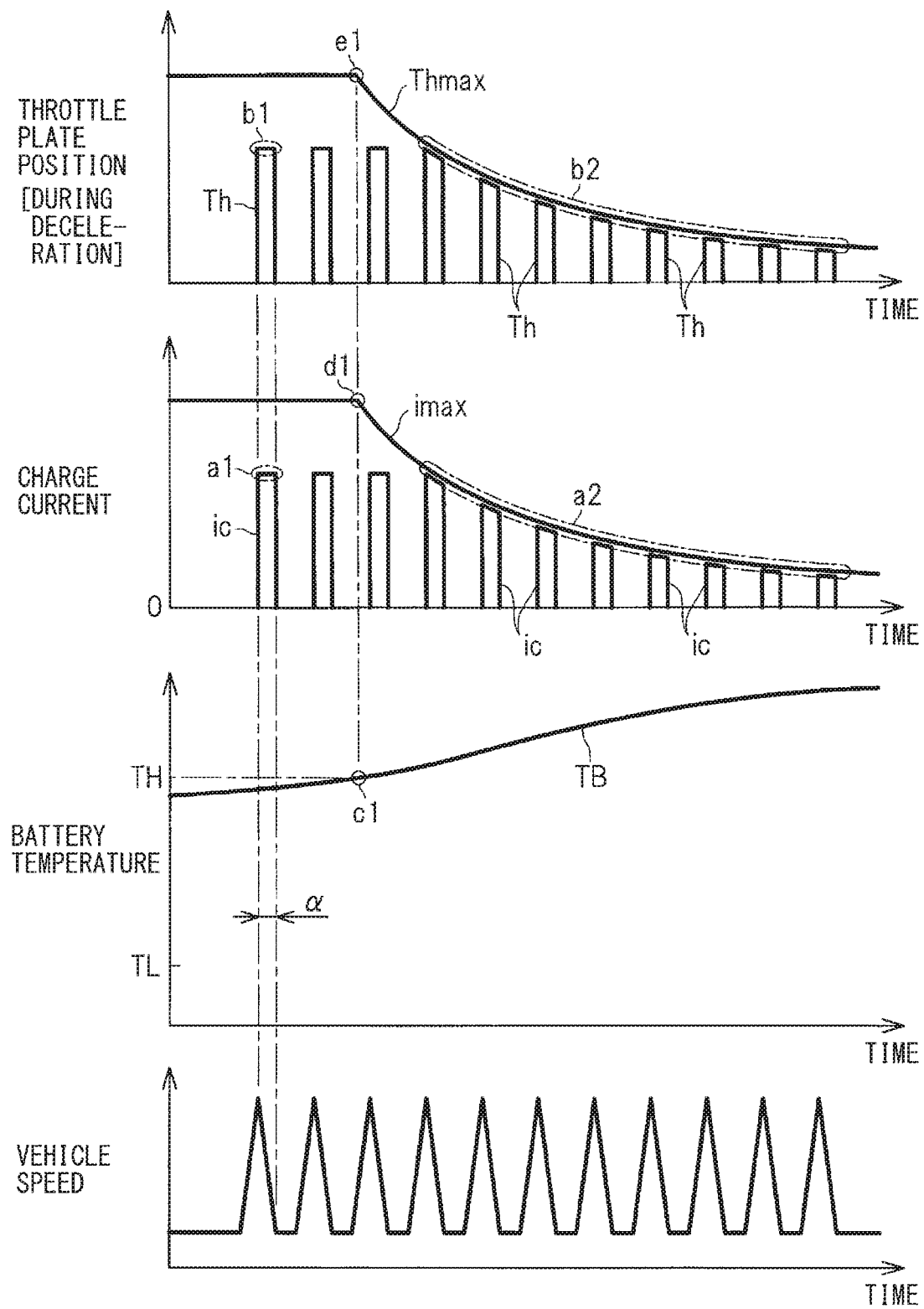
FIG. 12 is a timing chart of an example of transitions of the throttle plate position and a charge current during regenerative power generation.

Description now moves on to transitions of the throttle plate position Th in the high temperature region of the lithium ion battery 51, with reference to a timing chart. FIG. 12 is a timing chart of an example of the transitions of the throttle plate position Th and transitions of the charge current ic during the regenerative power generation. FIG. 12 illustrates a situation that the battery temperature TB is higher than the first temperature threshold TH. FIG. 12 also illustrates a situation with repetitive alternations of accelerated travel and the decelerated travel, that is, a situation with repetition of the regenerative power generation by the starter generator 16. It is to be noted that FIG. 12 illustrates the throttle plate position Th solely on the decelerated travel, and is devoid of illustration of the throttle plate position Th on the accelerated travel or on the steady travel.

As denoted by a reference character a in FIG. 12, on the decelerated travel, the starter generator 16 may be controlled to the regenerative power generation state, causing the charge current ic to be supplied to the lithium ion battery 51

(reference characters a1). Moreover, on the decelerated travel, the throttle valve 32 may be opened, causing an increase in the throttle plate position Th (reference characters b1), in order to reduce the engine braking and to increase the power generation torque. Afterwards, the charge and the discharge of the lithium ion battery 51 may be repeated, causing the battery temperature TB to increase and reach the first temperature threshold TH (reference characters c1). Thereupon, the current upper limit imax may be started to lower (reference characters d1) on the basis of the battery temperature TB, while the throttle plate position upper limit Thmax may be started to lower (reference characters e1) on the basis of the current upper limit imax.

Afterwards, the current upper limit imax may decrease in accompaniment with the increase in the battery temperature TB, and thereupon, the charge current ic may be limited by the current upper limit imax (reference characters a2). Moreover, the throttle plate position upper limit Thmax may decrease in accompaniment with the decrease in the current upper limit imax, and thereupon, the throttle plate position Th may be limited by the throttle plate position upper limit Thmax (reference characters b2). As mentioned above, the situation that the battery temperature TB increases to cause the limitation of the charge current ic is the situation that the decrease in the power generation torque causes the decrease in the throttle plate position Th to be tolerable. Accordingly, the throttle plate position Th may be limited by the throttle plate position upper limit Thmax, in order to decrease the amount of the intake air and to reduce the engine torque at the restart of the fuel injection.

[Low Temperature Region of Lithium Ion Battery]

Figure 13:
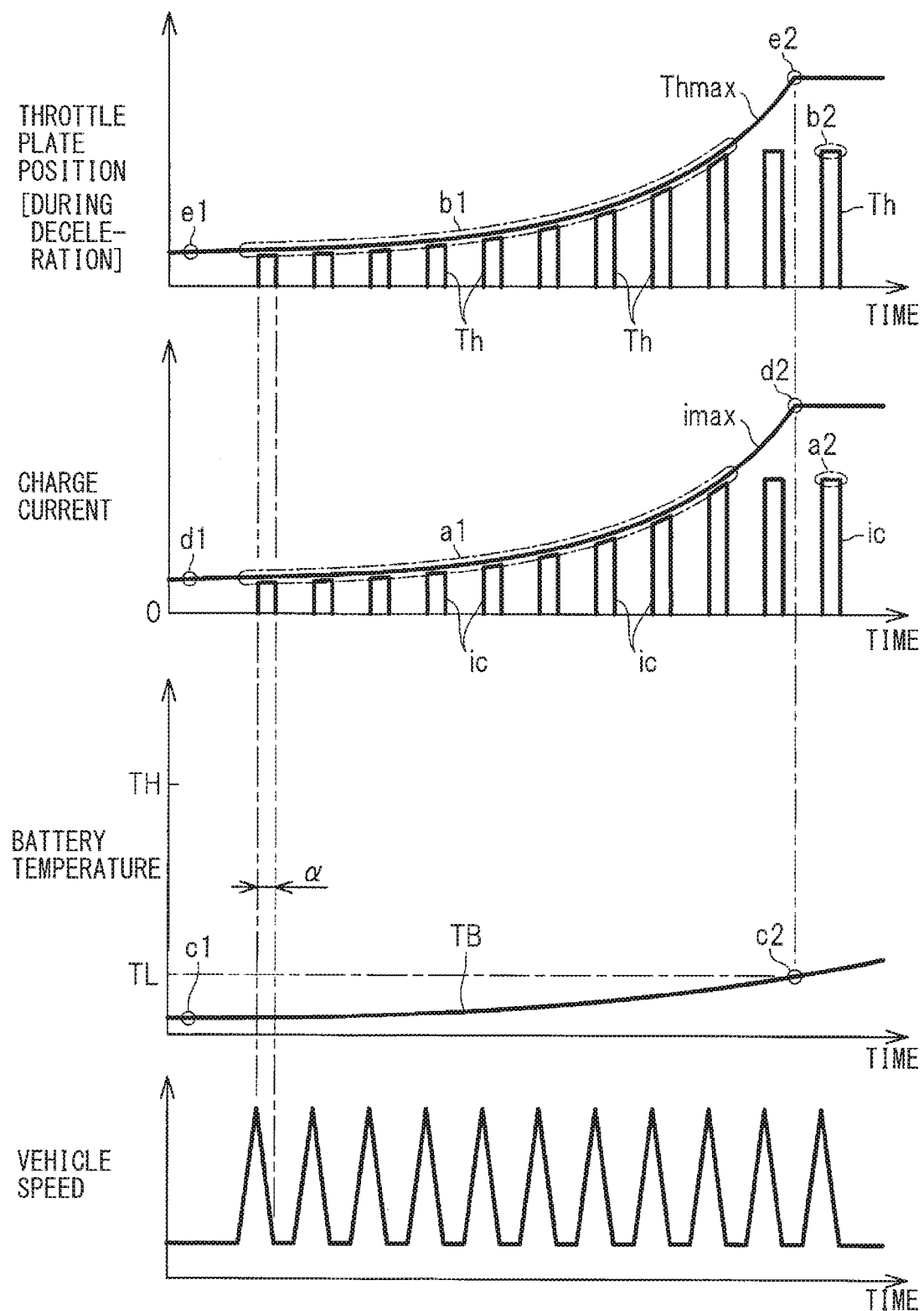
FIG. 13 is a timing chart of an example of the transitions of the throttle plate position and the charge current during the regenerative power generation.

Description is given next of transitions of the throttle plate position Th in the low temperature region of the lithium ion battery 51, with reference to a timing chart. FIG. 13 is a timing chart of an example of the transitions of the throttle plate position Th and the transitions of the charge current ic during the regenerative power generation. FIG. 13 illustrates a situation that the battery temperature TB is lower than the second temperature threshold TL. FIG. 13 also illustrates the situation with the repetitive alterations of the accelerated travel and the decelerated travel, that is, the situation with the repetition of the regenerative power generation by the starter generator 16. It is to be noted that FIG. 13 illustrates the throttle plate position Th solely on the decelerated travel, and is devoid of the illustration of the throttle plate position Th on the accelerated travel or on the steady travel.

As illustrated in FIG. 13, immediately after a start of travel in low temperature environment, the battery temperature TB may be lower than the second temperature threshold TL (reference characters c1). In this case, the current upper limit imax may be lowered (reference characters d1) on the basis of the battery temperature TB, while the throttle plate position upper limit Thmax may be lowered (reference characters e1) on the basis of the current upper limit imax. In such situations, as denoted by the reference character a, the regenerative power generation may be carried out in accompaniment with the decelerated travel, and thereupon, the charge current ic may be limited by the current upper limit imax (reference characters a1), while the throttle plate position Th may be limited by the throttle plate position upper limit Thmax (reference characters b1). As mentioned above, the situation that the battery temperature TB lowers to cause the limitation of the charge current ic is the situation that the decrease in the power generation torque causes the decrease in the throttle plate position Th to be tolerable. Accordingly, the throttle plate position Th may be limited by the throttle plate position upper limit Thmax, in order to decrease the amount of the intake air and to reduce the engine torque at the restart of the fuel injection.

Afterwards, the charge and the discharge of the lithium ion battery 51 may be repeated, causing the battery temperature TB to increase and reach the second temperature threshold TL (reference characters c2). Thereupon, the limitation imposed on the charge current ic by the current upper limit imax may be removed (reference characters d2), while the limitation imposed on the throttle plate position Th by the throttle plate position upper limit Thmax may be removed (reference characters e2). In such situations, the execution of the regenerative power generation in accompaniment with the decelerated travel causes the charge current is to be supplied to the lithium ion battery 51 (reference characters a2) without being limited by the current upper limit imax. Moreover, execution of the regenerative power generation control in accompaniment with the decelerated travel causes the throttle plate position Th to become greater (reference characters b2) without being limited by the throttle plate position upper limit Thmax, in order to reduce the engine braking and to increase the power generation torque.

[Other Setting Method of Throttle Plate Position Upper Limit]

Figure 14A:
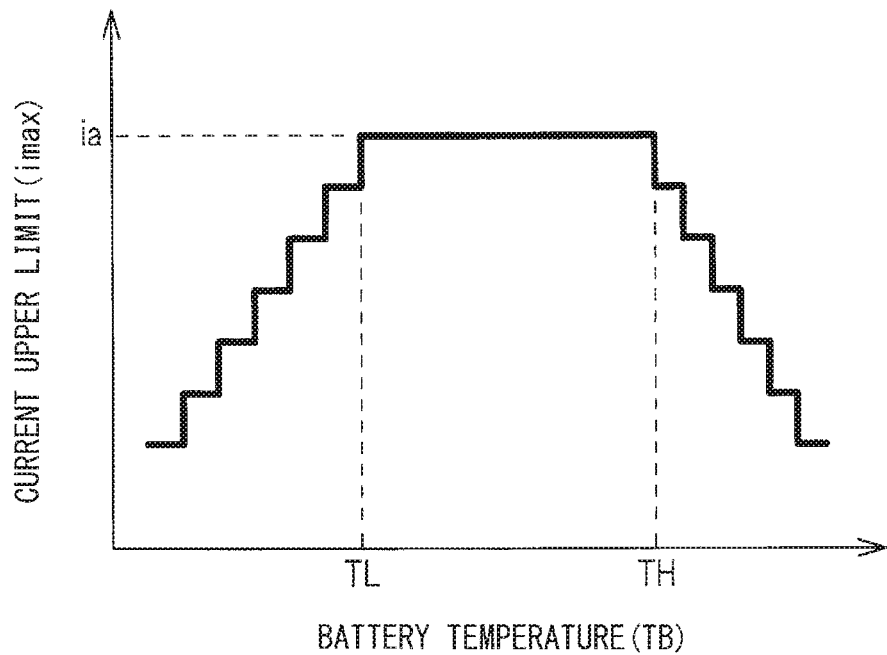
FIG. 14A is a diagram of an example of the relation between the battery temperature and the current upper limit.
Figure 14B:
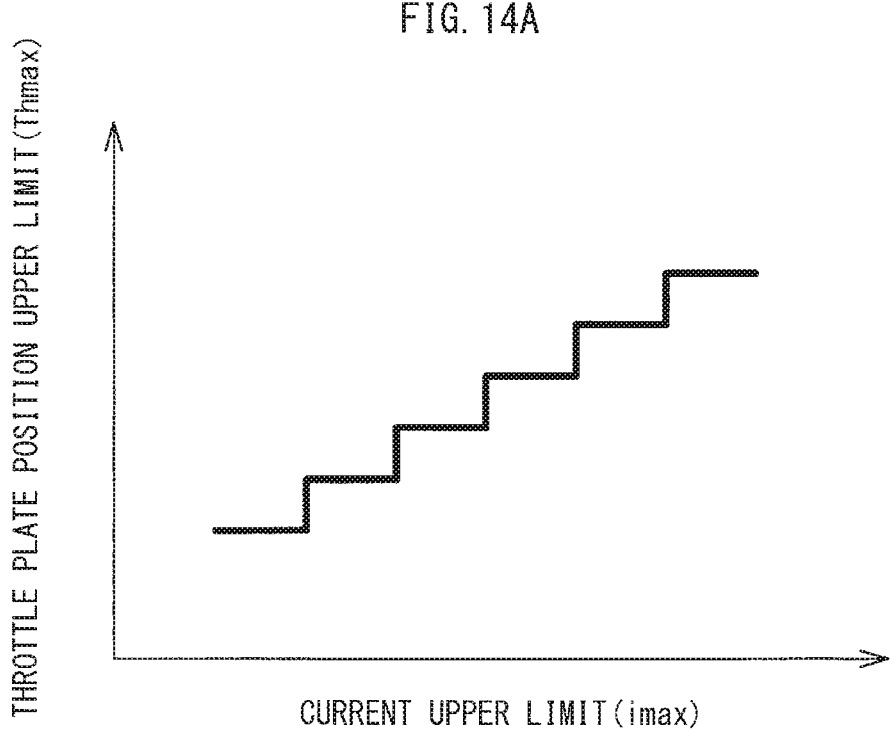
FIG. 14B is a diagram of an example of the relation between the current upper limit and the upper limit of the throttle plate position.

In the example illustrated in FIG. 10, in the region where the battery temperature TB is higher than the first temperature threshold TH, the current upper limit imax is lowered continuously as the battery temperature TB increases. However, this is non-limiting. Moreover, in the example illustrated in FIG. 10, in the region where the battery temperature TB is lower than the second temperature threshold TL, the current upper limit imax is lowered continuously as the battery temperature TB decreases. However, this is non-limiting. Furthermore, in the example illustrated in FIG. 11, the throttle plate position upper limit Thmax is lowered continuously as the current upper limit imax decreases, but this is non-limiting. FIG. 14A is a diagram of an example of the relation between the battery temperature TB and the current upper limit imax. FIG. 14B is a diagram of an example of the relation between the current upper limit imax and the throttle plate position upper limit Thmax.

As illustrated in FIG. 14A, in the region in which the battery temperature TB is higher than the first temperature threshold TH, the current upper limit imax may be lowered stepwise as the battery temperature TB increases. Moreover, as illustrated in FIG. 14A, in the region in which the battery temperature TB is lower than the second temperature threshold TL, the current upper limit imax may be lowered stepwise as the battery temperature TB decreases. Furthermore, as illustrated in FIG. 14B, the throttle plate position upper limit Thmax may be lowered stepwise as the current upper limit imax decreases. Setting the throttle plate position upper limit Thmax on the basis of the battery temperature TB with the use of the diagrams illustrated in FIGS. 14A and 14B makes it possible to control the throttle valve 32 properly as well.

Other Embodiment: Part 1

Figure 15A:
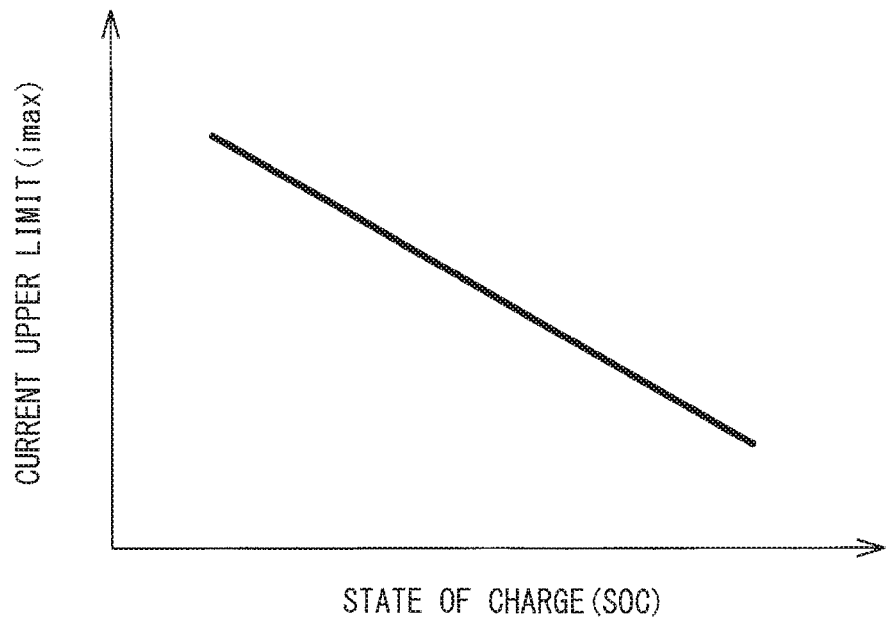
FIG. 15A is a diagram of an example of relation between a state of charge and the current upper limit.
Figure 15B:
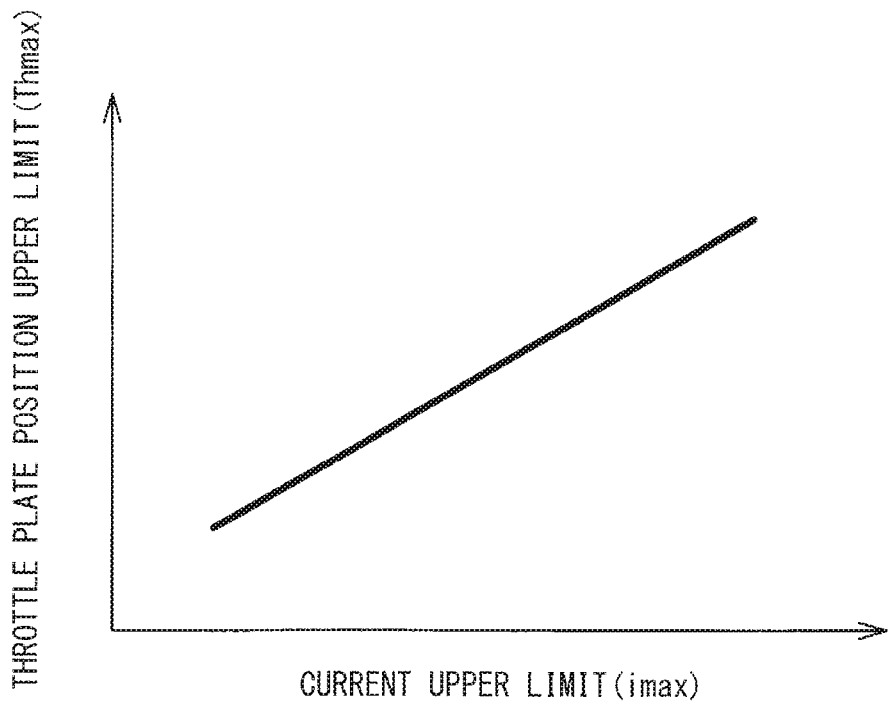
FIG. 15B is a diagram of an example of the relation between the current upper limit and the upper limit of the throttle plate position.
Figure 16A:
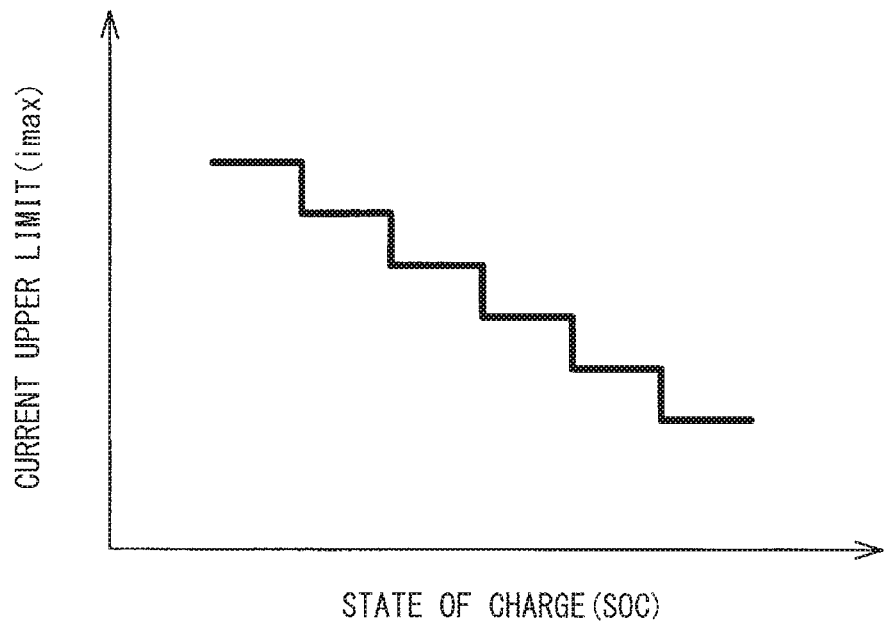
FIG. 16A is a diagram of an example of the relation between the state of charge and the current upper limit.
Figure 16B:
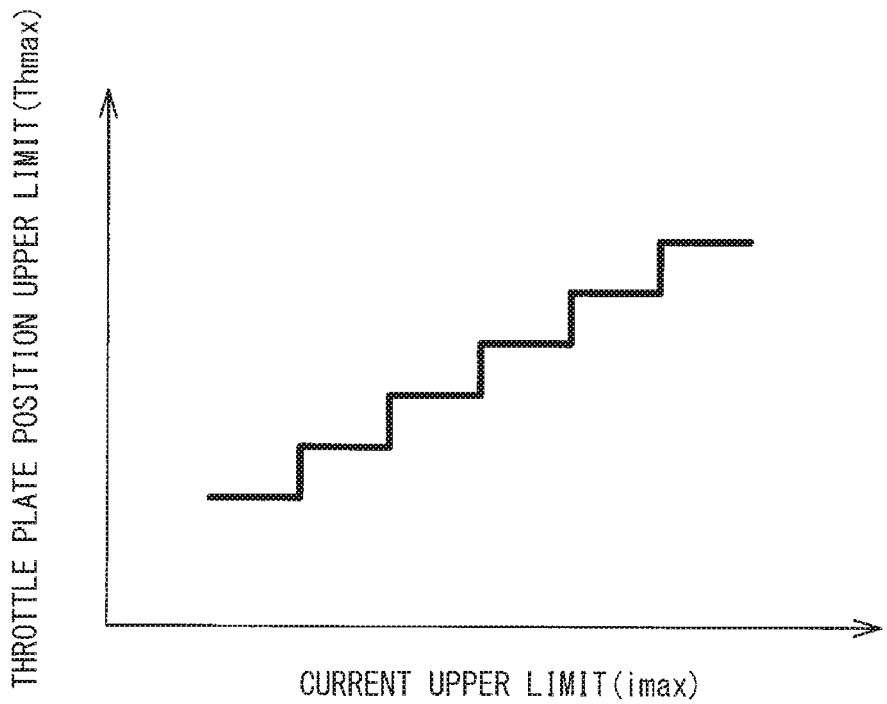
FIG. 16B is a diagram of an example of the relation between the current upper limit and the upper limit of the throttle plate position.

In the forgoing description, the throttle plate position upper limit Thmax of the throttle valve 32 is set on the basis of the battery temperature TB as the indicator of the state of the lithium ion battery 51. However, this is non-limiting. For example, the throttle plate position upper limit Thmax of the throttle valve 32 may be set on the basis of the state of charge SOC as an indicator of the state of the lithium ion battery 51. FIG. 15A is a diagram of an example of relation between the state of charge SOC and the current upper limit imax. FIG. 15B is a diagram of an example of the relation between the current upper limit imax and the throttle plate position upper limit Thmax. FIG. 16A is a diagram of an example of the relation between the state of charge SOC and the current upper limit imax. FIG. 16B is a diagram of an example of the relation between the current upper limit imax and the throttle plate position upper limit Thmax.

The throttle plate position upper limit setting unit 76 of the main controller 70 may set the current upper limit imax of the lithium ion battery 51 on the basis of the state of charge SOC of the lithium ion battery 51. The current upper limit imax means an upper limit of the charge current that is tolerble for the lithium ion battery 51. As illustrated in FIGS. 15A and 16A, the current upper limit imax of the lithium ion battery 51 may be lowered as the state of charge SOC of the lithium ion battery 51 increases. In the case where the state of charge SOC of the lithium ion battery 51 increases as mentioned above, that is, in a case where the lithium ion battery 51 comes close to a full charged state, the internal resistance of the lithium ion battery 51 increases, causing difficulties in the charge of the lithium ion battery 51. Accordingly, in the case where the state of charge SOC increases, the current upper limit imax may be lowered, to reduce the charge current of the lithium ion battery 51.

Thereafter, the throttle plate position upper limit setting unit 76 of the main controller 70 may set the throttle plate position upper limit Thmax of the throttle valve 32 on the basis of the current upper limit imax of the lithium ion battery 51. The throttle plate position upper limit Thmax means an upper limit of the throttle plate position Th that is tolerable during the regenerative power generation by the starter generator 16. As illustrated in FIGS. 15B and 16B, the throttle plate position upper limit Thmax of the throttle valve 32 may be lowered as the current upper limit imax of the lithium ion battery 51 decreases.

In other words, the situation that the current upper limit imax of the lithium ion battery 51 is lowered is the situation that the power-generated current of the starter generator 16 is limited, and is the situation that the power generation torque of the starter generator 16 is limited. That is to say, in such situations, the vehicle deceleration rate is hardly subject to the excessive increase because of the power generation torque during the regenerative power generation, and the decrease in the throttle plate position Th is tolerable. Thus, the throttle plate position upper limit Thmax may be lowered, under the situation that the decrease in the throttle plate position Th is tolerable, that is, under the situation that the current upper limit imax lowers. Hence, it is possible to close the throttle valve 32 to reduce the amount of the intake air, and to reduce the engine torque at the restart of the fuel injection.

As described, setting the throttle plate position upper limit Thmax of the throttle valve 32 on the basis of the state of charge SOC as the indicator of the state of the lithium ion battery 51 makes it possible to control the throttle valve 32 properly as well.

Other Embodiment: Part 2

Figure 17A:
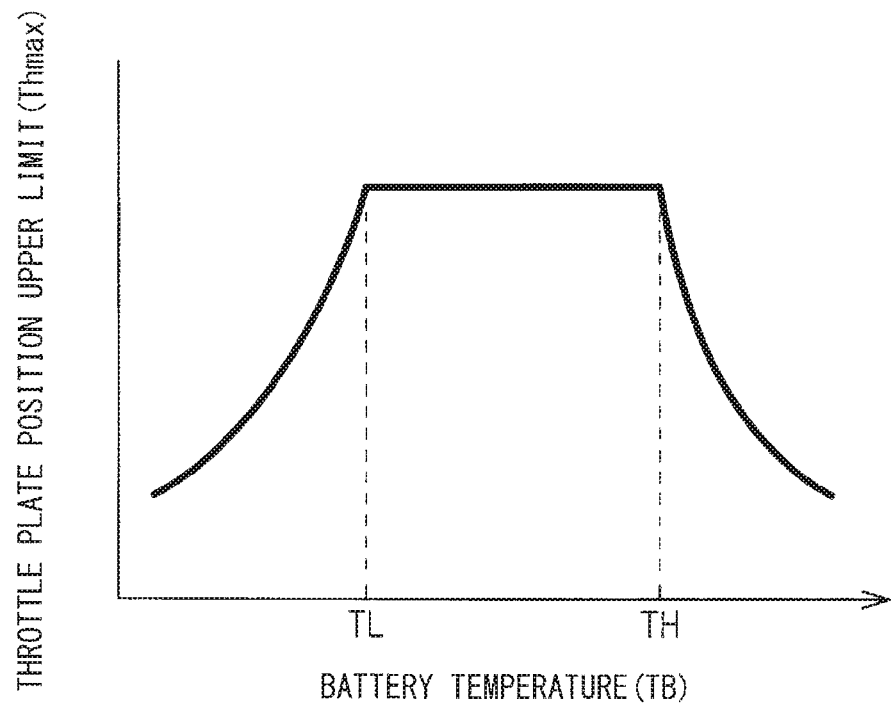
FIG. 17A is a diagram of an example of relation between the battery temperature and the upper limit of the throttle plate position.
Figure 17B:
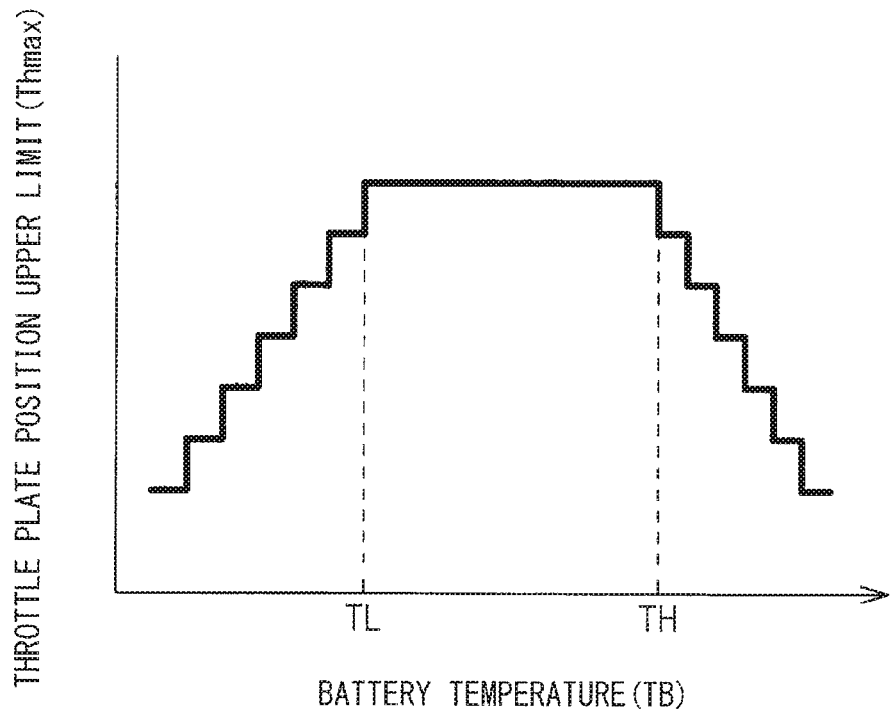
FIG. 17B is a diagram of an example of the relation between the battery temperature and the upper limit of the throttle plate position.

In the examples illustrated in FIGS. 10 and 11, the current upper limit imax is set on the basis of the battery temperature TB, and the throttle plate position upper limit Thmax is set on the basis of the current upper limit imax. However, this is non-limiting. In other words, in the examples illustrated in FIGS. 10 and 11, the throttle plate position upper limit Thmax is set indirectly from the battery temperature TB, but this is non-limiting. The throttle plate position upper limit Thmax may be set directly from the battery temperature TB. FIG. 17A is a diagram of an example of relation between the battery temperature TB and the throttle plate position upper limit Thmax. FIG. 17B is a diagram of an example of the relation between the battery temperature TB and the throttle plate position upper limit Thmax.

The throttle plate position upper limit setting unit 76 of the main controller 70 may set the throttle plate position upper limit Thmax of the throttle valve 32 on the basis of the battery temperature TB of the lithium ion battery 51. The throttle plate position upper limit Thmax means the upper limit of the throttle plate position Th that is tolerable during the regenerative power generation by the starter generator 16. As illustrated in FIGS. 17A and 17B, in the region where the battery temperature TB is higher than the first temperature threshold TH, the throttle plate position upper limit Thmax may be lowered as the battery temperature TB increases. In the region where the battery temperature TB is lower than the second temperature threshold TL that is lower than the first temperature threshold TH, the throttle plate position upper limit Thmax may be lowered as the battery temperature TB decreases.

In other words, in the region where the battery temperature TB is higher than the first temperature threshold TH, the charge current of the lithium ion battery 51 may be reduced, in order to lower the battery temperature TB and to protect the lithium ion battery 51. In the region where the battery temperature TB is lower than the second temperature threshold TL that is lower than the first temperature threshold TH, the charge current of the lithium ion battery 51 may be reduced, because the internal resistance of the lithium ion battery 51 increases. As described, in the high temperature region and the low temperature region of the lithium ion battery 51, i.e., in the regions where the charge current is reduced, the throttle plate position upper limit Thmax of the throttle valve 32 may be lowered.

A situation that the charge current of the lithium ion battery 51 is lowered in the high temperature region and the low temperature region is the situation that the power-generated current of the starter generator 16 is limited, and is the situation that the power generation torque of the starter generator 16 is limited. That is to say, in such situations, the vehicle deceleration rate is hardly subject to the excessive increase because of the power generation torque during the regenerative power generation, and the decrease in the throttle plate position Th is tolerable. As described, the throttle plate position upper limit Thmax may be lowered, under the situation that the decrease in the throttle plate position Th is tolerable, i.e., in the high temperature region and the low temperature region of the lithium ion battery 51. Hence, it is possible to close the throttle valve 32 and to reduce the amount of the intake air, and to reduce the engine torque at the restart of the fuel injection.

As described, as with the examples illustrated in FIGS. 10, 11, 12, 13, 14A, and 14B, setting the throttle plate position upper limit Thmax directly from the battery temperature TB with the use of the diagrams illustrated in FIGS. 17A and 17B makes it possible to close the throttle valve 32 and to reduce the amount of the intake air during the regenerative power generation, and to reduce the engine torque at the restart of the fuel injection, in the high temperature region and the low temperature region of the lithium ion battery 51. In other words, it is possible to control the throttle valve 32 properly during the regenerative power generation by the starter generator 16.

Other Embodiment: Part 3

Figure 18A:
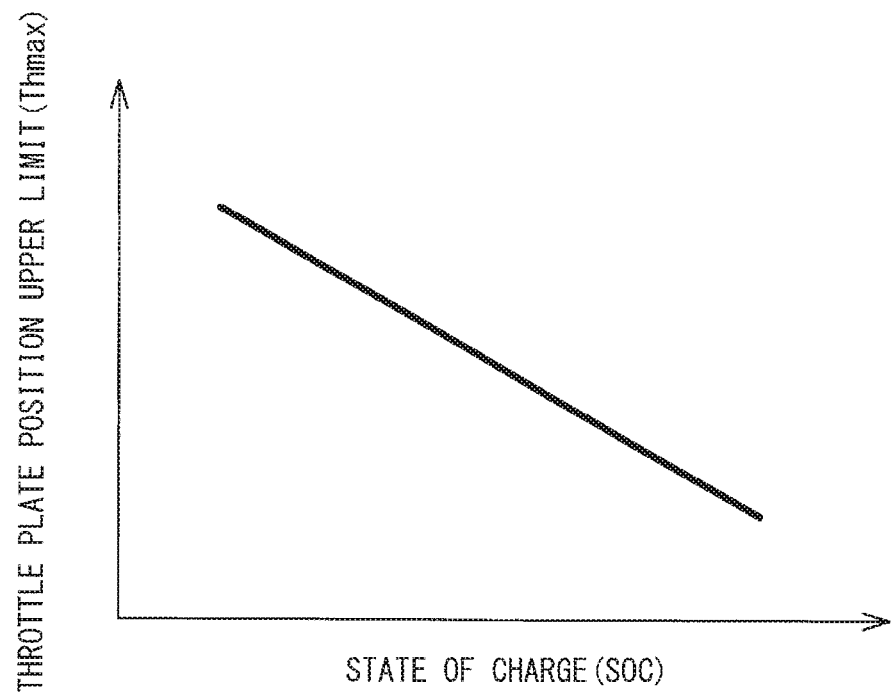
FIG. 18A is a diagram of an example of relation between the state of charge and the upper limit of the throttle plate position.
Figure 18B:
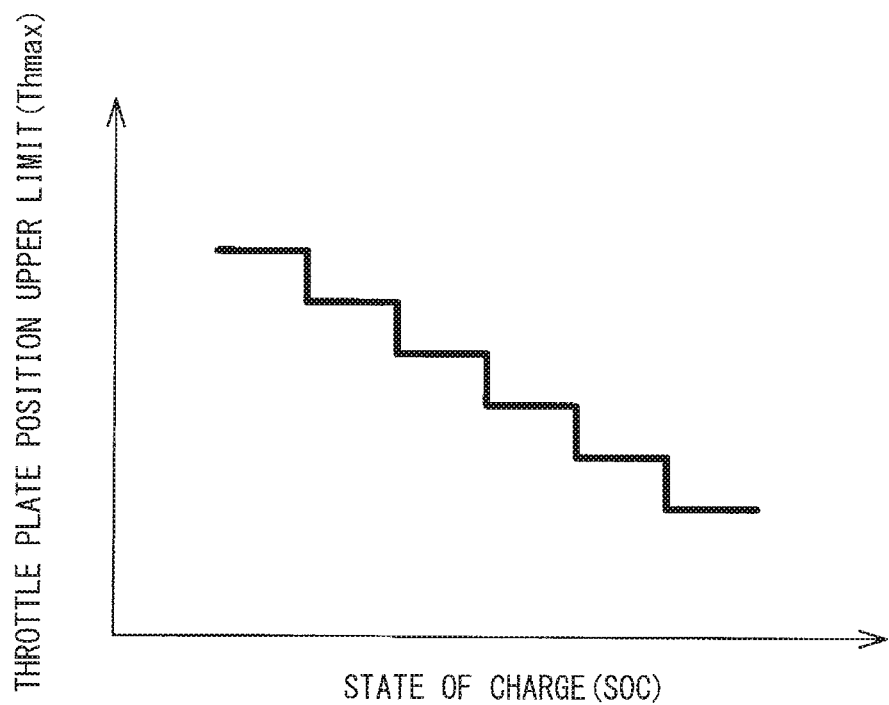
FIG. 18B is a diagram of an example of the relation between the state of charge and the upper limit of the throttle plate position.

In the examples illustrated in FIGS. 15A, 15B, 16A, and 16B, the current upper limit imax is set on the basis of the state of charge SOC, and the throttle plate position upper limit Thmax is set on the basis of the current upper limit imax. However, this is non-limiting. In other words, in the examples illustrated in FIGS. 15A, 15B, 16A, and 16B, the throttle plate position upper limit Thmax is set indirectly from the state of charge SOC, but this is non-limiting. The throttle plate position upper limit Thmax may be set directly from the state of charge SOC. FIG. 18A is a diagram of an example of relation between the state of charge SOC and the throttle plate position upper limit Thmax. FIG. 18B is a diagram of an example of the relation between the state of charge SOC and the throttle plate position upper limit Thmax.

The throttle plate position upper limit setting unit 76 of the main controller 70 may set the throttle plate position upper limit Thmax of the throttle valve 32 on the basis of the state of charge SOC of the lithium ion battery 51. The throttle plate position upper limit Thmax means the upper limit of the throttle plate position Th that is tolerable during the regenerative power generation by the starter generator 16. As illustrated in FIGS. 18A and 18B, the throttle plate position upper limit Thmax may be lowered as the state of charge SOC of the lithium ion battery 51 increases.

In the case where the state of charge SOC of the lithium ion battery 51 increases as mentioned above, i.e., in the case where the lithium ion battery 51 comes close to the full charged state, the internal resistance of the lithium ion battery 51 increases, causing difficulties in the charge of the lithium ion battery 51. As described, under a situation that the state of charge SOC of the lithium ion battery 51 is high, i.e., under a situation with suppression of the charge current, the throttle plate position upper limit Thmax of the throttle valve 32 may be lowered.

The situation that the high state of charge SOC of the lithium ion battery 51 causes the suppression of the charge current is the situation that the power-generated current of the starter generator 16 is limited, and is the situation that the power generation torque of the starter generator 16 is limited. That is to say, in such situations, the vehicle deceleration rate is hardly subject to the excessive increase because of the power generation torque during the regenerative power generation, and the decrease in the throttle plate position Th is tolerable. As described, the throttle plate position upper limit Thmax may be lowered, under the situation that the decrease in the throttle plate position Th is tolerable, i.e., under the situation that the state of charge SOC of the lithium ion battery 51 is high. Hence, it is possible to close the throttle valve 32 and to reduce the amount of the intake air, and to reduce the engine torque at the restart of the fuel injection.

As described, as with the examples illustrated in FIGS. 15A, 15B, 16A, and 16B, setting the throttle plate position upper limit Thmax directly from the state of charge SOC with the use of the diagrams illustrated in FIGS. 18A and 18B makes it possible to close the throttle valve 32 and to reduce the amount of the intake air during the regenerative power generation, and to reduce the engine torque at the restart of the fuel injection, in the case with the high state of charge SOC of the lithium ion battery 51. In other words, it is possible to control the throttle valve 32 properly during the regenerative power generation by the starter generator 16.

Although some preferred embodiments of the technology are described above by way of example with reference to the accompanying drawings, the technology is by no means limited to the embodiments described above. It should be appreciated that modifications and alterations may be made by persons skilled in the art without departing from the scope as defined by the appended claims. In the forgoing description, as the generator coupled to the engine 12, provided is the starter generator 16 that also serves as the electric motor. However, this is non-limiting. For example, an alternator that does not serve as an electric motor may be adopted as the generator coupled to the engine 12. Moreover, in the forgoing description, the main controller 70 includes the throttle valve control unit 73, the power generation control unit 74, and the throttle plate position upper limit setting unit 76. However, this is non-limiting. The throttle valve control unit 73, the power generation control unit 74, and the throttle plate position upper limit setting unit 76 may be provided in another controller or be distributed over other controllers.

In the forgoing description, the current upper limit imax is set on the basis of the battery temperature TB or the state of charge SOC. The current upper limit imax is the upper limit of the charge current that is tolerable for the lithium ion battery 51, but this is non-limiting. The current upper limit imax may be an upper limit of the power-generated current to be outputted from the starter generator 16. As described, during the regenerative power generation by the starter generator 16, most of the power-generated current of the starter generator 16 is supplied to the lithium ion battery 51. In other words, during the regenerative power generation by the starter generator 16, the upper limit of the charge current to charge the lithium ion battery 51 and the upper limit of the power-generated current to be outputted from the starter generator 16 are upper limits that are linked with each other. Accordingly, the upper limit of the power-generated current to be outputted from the starter generator 16 may be set on the basis of the battery temperature TB or the state of charge SOC, and the throttle plate position upper limit Thmax may be set on the basis of the upper limit of the power-generated current.

In the forgoing description, the decelerated travel of the vehicle 11 is exemplified by the coasting, i.e., inertia travel. However, this is non-limiting. For example, the starter generator 16 may be brought to the regenerative power generation, on the decelerated travel that includes decelerating while stepping down the brake pedal. Moreover, it suffices for the openwise of the throttle valve 32 to be a direction in which the throttle plate position becomes larger than the reference value X1. In other words, the openwise of the throttle valve 32 may be a fully opened state, or other states than the fully opened state. Likewise, it suffices for the closewise of the throttle valve 32 to be a direction in which the throttle plate position becomes smaller than the reference value X1. In other words, the closewise of the throttle valve 32 may be a fully closed state or other states than the fully closed state.

In the forgoing description, the ignition retard control of the engine 12 is executed at the restart of the fuel injection into the engine 12. However, this is non-limiting. The fuel injection may be restarted without executing the ignition retard control, insofar as the engine torque is sufficiently suppressed by an appropriate control of the throttle valve 32 during the regenerative power generation. Thus, avoiding the ignition retard control makes it possible to lower a temperature of the exhaust gas and to protect the catalyst converter 23.

In the example illustrated in FIG. 8, the starter generator 16 is controlled in the powering state for the predetermined time. However, this is non-limiting. For example, the starter generator 16 may be controlled in the powering state until the intake tube pressure Pi reaches a predetermined target value. Moreover, in a case where the state of charge SOC of the lithium ion battery 51 is low, a powering control of the starter generator 16 may be stopped. Furthermore, in the example illustrated in FIG. 8, the starter generator 16 is switched from the powering state to the power generation suspended state. However, this is non-limiting. For example, the starter generator 16 may be switched from the powering state to the combustion power generation state in the case where the state of charge SOC of the lithium ion battery 51 is low.

In the forgoing description, the two electrical energy accumulators are coupled to the starter generator 16. However, this is non-limiting. A single electrical energy accumulator may be coupled to the starter generator 16. Moreover, in the forgoing description, the lithium ion battery 51 and the lead battery 52 are adopted, but this is non-limiting. Batteries or capacitors of other kinds may be adopted. Moreover, in the example illustrated in FIGS. 1 and 2, the switch SW2 is provided on the positive electrode line 54 of the lithium ion battery 51. However, this is non-limiting. For example, as denoted by an alternate long and short dashed line in FIG. 2, the switch SW2 may be provided on the negative electrode line 58 of the lithium ion battery 51.

The throttle valve control unit 73, the power generation control unit 74, the throttle plate position upper limit setting unit 76, and the main controller 70 illustrated in FIGS. 1 and 3 are implementable by circuitry including at least one semiconductor integrated circuit such as at least one processor (e.g., a central processing unit (CPU)), at least one application specific integrated circuit (ASIC), and/or at least one field programmable gate array (FPGA). At least one processor is configurable, by reading instructions from at least one machine readable non-transitory tangible medium, to perform all or a part of functions of the throttle valve control unit 73, the power generation control unit 74, the throttle plate position upper limit setting unit 76, and the main controller 70. Such a medium may take many forms, including, but not limited to, any type of magnetic medium such as a hard disk, any type of optical medium such as a CD and a DVD, any type of semiconductor memory (i.e., semiconductor circuit) such as a volatile memory and a non-volatile memory. The volatile memory may include a DRAM and a SRAM, and the nonvolatile memory may include a ROM and a NVRAM. The ASIC is an integrated circuit (IC) customized to perform, and the FPGA is an integrated circuit designed to be configured after manufacturing in order to perform, all or a part of the functions of the throttle valve control unit 73, the power generation control unit 74, the throttle plate position upper limit setting unit 76, and the main controller 70 illustrated in FIGS. 1 and 3.

It should be appreciated that modifications and alterations may be made by persons skilled in the art without departing from the scope as defined by the appended claims. The use of the terms first, second, etc. does not denote any order or importance, but rather the terms first, second, etc. are used to distinguish one element from another. The technology is intended to include such modifications and alterations in so far as they fall within the scope of the appended claims or the equivalents thereof.

The invention claimed is:

1. A vehicle power supply apparatus to be mounted on a vehicle that includes an engine, the vehicle power supply apparatus comprising:
   a generator coupled to the engine;
   an electrical energy accumulator able to be coupled to the generator;
   a throttle valve provided in an intake system of the engine;
   a power generation controller configured to allow the generator to perform regenerative power generation on decelerated travel of the vehicle;
   a throttle plate position upper limit setting unit configured to set an upper limit of a throttle plate position of the throttle valve on a basis of a state of the electrical energy accumulator; and
   a throttle valve controller configured to control the throttle plate position within a range downward from the upper limit of the throttle plate position, during the regenerative power generation by the generator,
   wherein during the regenerative power generation by the generator, the throttle plate position of the throttle valve is controlled to be above a predetermined reference point, and
   wherein from an end of the generative power generation by the generator to a start of a fuel injection into the engine, the throttle plate position of the throttle valve is controlled to be below the predetermined reference point.

2. The vehicle power supply apparatus according to claim 1, wherein the throttle plate position upper limit setting unit sets a current upper limit on the basis of the state of the electrical energy accumulator, and sets the upper limit of the throttle plate position on a basis of the current upper limit.

3. The vehicle power supply apparatus according to claim 2, wherein the throttle plate position upper limit setting unit lowers the upper limit of the throttle plate position as the current upper limit decreases.

4. The vehicle power supply apparatus according to claim 2, wherein the throttle plate position upper limit setting unit sets the current upper limit on a basis of a temperature of the electrical energy accumulator.

5. The vehicle power supply apparatus according to claim 4, wherein the throttle plate position upper limit setting unit lowers the current upper limit as the temperature of the electrical energy accumulator increases, in a region where the temperature of the electrical energy accumulator is higher than a first temperature threshold.

6. The vehicle power supply apparatus according to claim 5, wherein the throttle plate position upper limit setting unit lowers the current upper limit as the temperature of the electrical energy accumulator decreases, in a region where the temperature of the electrical energy accumulator is lower than a second temperature threshold, the second temperature threshold being lower than the first temperature threshold.

7. The vehicle power supply apparatus according to claim 2, wherein the throttle plate position upper limit setting unit sets the current upper limit on a basis of a state of charge of the electrical energy accumulator.

8. The vehicle power supply apparatus according to claim 7, wherein the throttle plate position upper limit setting unit lowers the current upper limit as the state of charge increases.

9. The vehicle power supply apparatus according to claim 1, wherein the throttle plate position upper limit setting unit sets the upper limit of the throttle plate position on a basis of a temperature of the electrical energy accumulator.

10. The vehicle power supply apparatus according to claim 9, wherein the throttle plate position upper limit setting unit lowers the upper limit of the throttle plate position as the temperature of the electrical energy accumulator increases, in a region where the temperature of the electrical energy accumulator is higher than a first temperature threshold.

11. The vehicle power supply apparatus according to claim 10, wherein the throttle plate position upper limit setting unit lowers the upper limit of the throttle plate position as the temperature of the electrical energy accumulator decreases, in a region where the temperature of the electrical energy accumulator is lower than a second temperature threshold, the second temperature threshold being lower than the first temperature threshold.

12. The vehicle power supply apparatus according to claim 1, wherein the throttle plate position upper limit setting unit sets the upper limit of the throttle plate position on a basis of a state of charge of the electrical energy accumulator.

13. The vehicle power supply apparatus according to claim 12, wherein the throttle plate position upper limit setting unit lowers the upper limit of the throttle plate position as the state of charge increases.

14. A vehicle power supply apparatus to be mounted on a vehicle that includes an engine, the vehicle power supply apparatus comprising:

a generator coupled to the engine;
an electrical energy accumulator able to be coupled to the generator;
a throttle valve provided in an intake system of the engine; and
circuitry configured to
    allow the generator to perform regenerative power generation on decelerated travel of the vehicle,
    set an upper limit of a throttle plate position of the throttle valve on a basis of a state of the electrical energy accumulator, and
    control the throttle plate position within a range downward from the upper limit of the throttle plate position, during the regenerative power generation by the generator,
wherein during the regenerative power generation by the generator, the throttle plate position of the throttle valve is controlled to be above a predetermined reference point, and
wherein from an end of the generative power generation by the generator to a start of a fuel injection into the engine, the throttle plate position of the throttle valve is controlled to be below the predetermined reference point.

* * * * *